US011100234B2

(12) United States Patent
Oonishi et al.

(10) Patent No.: US 11,100,234 B2
(45) Date of Patent: Aug. 24, 2021

(54) WORK RECORDING APPARATUS, SYSTEM, PROGRAM, AND METHOD PREVENTING CONFIDENTIAL INFORMATION LEAKS

(71) Applicant: Hitachi Systems, Ltd., Tokyo (JP)

(72) Inventors: Kentarou Oonishi, Tokyo (JP); Daisuke Katsumata, Tokyo (JP); Tooru Sugimoto, Tokyo (JP); Naoto Murayama, Tokyo (JP); Nobuhiro Ihori, Tokyo (JP); Naoto Miyao, Tokyo (JP); Shinya Iguchi, Tokyo (JP); Kenta Takahashi, Tokyo (JP); Takayuki Fujiwara, Tokyo (JP); Hiroaki Takatsuki, Tokyo (JP)

(73) Assignee: Hitachi Systems, Ltd., Tokyo (JP)

( * ) Notice: Subject to any disclaimer, the term of this patent is extended or adjusted under 35 U.S.C. 154(b) by 0 days.

(21) Appl. No.: 15/318,252

(22) PCT Filed: Jun. 13, 2014

(86) PCT No.: PCT/JP2014/065778
§ 371 (c)(1),
(2) Date: Dec. 12, 2016

(87) PCT Pub. No.: WO2015/189994
PCT Pub. Date: Dec. 17, 2015

(65) Prior Publication Data
US 2017/0124338 A1  May 4, 2017

(51) Int. Cl.
*G06F 21/60* (2013.01)
*G06F 21/62* (2013.01)
(Continued)

(52) U.S. Cl.
CPC .......... *G06F 21/602* (2013.01); *G06F 21/606* (2013.01); *G06F 21/629* (2013.01);
(Continued)

(58) Field of Classification Search
CPC ........ G06F 21/602; G06F 21/60; G06F 16/44; G06F 15/46; G06F 3/011; G06F 21/10;
(Continued)

(56) References Cited

U.S. PATENT DOCUMENTS 3,751,150 A * 8/1973 Roberts ................. G03B 31/02
353/7
4,775,901 A * 10/1988 Nakano ............ G11B 20/00688
360/60

(Continued)

FOREIGN PATENT DOCUMENTS

CN   102413321 A  * 4/2012
CN   101282447 B  * 3/2016  ............. H04H 60/31
(Continued)

OTHER PUBLICATIONS

Pattern Recognition—Real-time traffic sign recognition from video by class-specific discriminative features by Andrzej Ruta, YongminLi and Xiaohui Liu (School of Information Systems, Computing and Mathematics, Brunel University, Uxbridge, Middlesex UB8 3PH,UK) pp. 15; Accepted May 26, 2009.*

(Continued)

*Primary Examiner* — Samson B Lemma
*Assistant Examiner* — Ali H. Cheema
(74) *Attorney, Agent, or Firm* — Crowell & Moring LLP

(57) ABSTRACT

As a technology for preventing the leaking of confidential information more properly, provided is a work recording apparatus including: a recording control unit configured to record a work situation; a position detection unit configured to detect a position; and a usable function restriction unit configured to specify an applicable predetermined state through use of the position detected by the position detection (Continued)

unit and restrict a part or all of functions of the recording control unit based on the specified applicable predetermined state.

10 Claims, 15 Drawing Sheets

(51) Int. Cl.
| | | |
|---|---|---|
| H04W 12/37 | (2021.01) | |
| H04W 12/02 | (2009.01) | |
| G06Q 10/06 | (2012.01) | |
| G09C 5/00 | (2006.01) | |
| H04L 9/08 | (2006.01) | |
| H04L 29/06 | (2006.01) | |

(52) U.S. Cl.
CPC ......... G06Q 10/06398 (2013.01); G09C 5/00 (2013.01); H04L 9/088 (2013.01); H04L 63/0428 (2013.01); H04W 12/02 (2013.01); H04W 12/37 (2021.01); *G06F 2221/2111* (2013.01)

(58) Field of Classification Search
CPC .................. G06F 21/606; G06F 21/629; G06F 2221/2111; H04L 9/088; H04L 9/14; H04L 9/08; H04L 9/085; H04L 63/0428; G01P 15/00; H04N 21/435; H04N 1/00204; G07C 5/0866; A61B 5/1123; H04W 4/20; H04W 12/37; H04W 12/02; G11B 20/00688; G11B 20/00086; G09C 5/00; G06Q 10/06398
USPC ......... 713/193; 702/141; 725/132, 134, 141; 700/245, 263; 715/723; 380/44; 726/32, 726/34; 705/50; 360/27, 60; 386/241, 386/258, 278, 295
See application file for complete search history.

(56) References Cited

U.S. PATENT DOCUMENTS

| | | | | |
|---|---|---|---|---|
| 4,951,223 | A * | 8/1990 | Crowley et al. ........ | G06F 15/46 364/507 |
| 5,003,410 | A * | 3/1991 | Endoh .............. | G11B 20/00086 360/27 |
| 5,168,531 | A * | 12/1992 | Sigel ........................ | G06F 3/011 345/157 |
| 7,249,898 | B2 * | 7/2007 | Gaku Watanabe .... | G03B 17/00 396/439 |
| 7,650,646 | B2 * | 1/2010 | Asano ...................... | G06F 21/10 726/32 |
| 7,890,709 | B2 * | 2/2011 | Yoo .......................... | G06F 21/10 705/50 |
| 7,983,872 | B2 * | 7/2011 | Makino ................. | A61B 5/1123 702/141 |
| 8,068,142 | B2 * | 11/2011 | Watanabe .......... | H04N 1/00127 348/211.2 |
| 8,548,443 | B2 * | 10/2013 | Anson .................. | H04W 4/021 455/410 |
| 9,858,496 | B2 * | 1/2018 | Sun ...................... | G06K 9/3233 |
| 2001/0035880 | A1 * | 11/2001 | Musatov ............. | G06F 3/04886 715/764 |
| 2002/0144186 | A1 * | 10/2002 | Ito ........................... | G11B 20/12 714/42 |
| 2002/0169971 | A1 * | 11/2002 | Asano ..................... | G06F 21/10 713/193 |
| 2004/0034792 | A1 * | 2/2004 | Ueno ................. | H04N 1/00204 726/34 |
| 2004/0037196 | A1 * | 2/2004 | Matsumoto ............ | G11B 7/083 369/53.19 |
| 2005/0254788 | A1 * | 11/2005 | Yamagata ........ | G11B 20/00753 386/258 |
| 2005/0267635 | A1 * | 12/2005 | Okada ..................... | B25J 9/101 700/245 |
| 2006/0200842 | A1 * | 9/2006 | Chapman ........... | H04N 21/4882 725/34 |
| 2007/0118857 | A1 * | 5/2007 | Chen .................. | H04N 21/4334 725/61 |
| 2008/0155637 | A1 * | 6/2008 | Du Breuil .......... | H04N 7/17318 725/134 |
| 2008/0235303 | A1 * | 9/2008 | Sensu ................ | H04N 1/00204 |
| 2008/0259173 | A1 * | 10/2008 | Yahata ................. | G11B 27/105 348/220.1 |
| 2008/0292267 | A1 * | 11/2008 | Yamada ............... | H04N 9/8042 386/241 |
| 2010/0158471 | A1 * | 6/2010 | Ogikubo ................ | G11B 27/34 386/278 |
| 2010/0201819 | A1 * | 8/2010 | Minowa ............... | G07C 5/0866 348/148 |
| 2010/0220978 | A1 * | 9/2010 | Ogikubo .............. | G11B 27/034 715/716 |
| 2011/0298941 | A1 * | 12/2011 | Okawa ............... | H04N 5/23219 348/222.1 |
| 2013/0039491 | A1 * | 2/2013 | Unagami ................ | G06F 21/64 380/44 |
| 2014/0173679 | A1 * | 6/2014 | Kimura ............ | H04N 21/41422 725/132 |
| 2014/0186055 | A1 * | 7/2014 | Oshima ................ | H04B 10/116 398/186 |
| 2014/0195917 | A1 * | 7/2014 | Man ........................ | G06F 16/44 715/723 |
| 2015/0098694 | A1 * | 4/2015 | Mayuzumi ........... | H04N 9/8042 386/295 |
| 2015/0172449 | A1 * | 6/2015 | Clavenna, II ..... | H04M 1/72577 455/418 |

FOREIGN PATENT DOCUMENTS

| | | | | |
|---|---|---|---|---|
| JP | 2002226200 | A | * | 8/2002 |
| JP | 2002226200 | A | | 8/2002 |
| JP | 2004-104576 | A | | 4/2004 |
| JP | 2005-85190 | A | | 3/2005 |
| JP | 2008-206017 | A | | 9/2008 |
| JP | 2010206609 | A | * | 9/2010 |
| JP | 2010206609 | A | | 9/2010 |
| JP | 2010-287145 | A | | 12/2010 |
| JP | 2010287145 | A | * | 12/2010 |

OTHER PUBLICATIONS

Video-based smoke detection with histogram sequence of LBP and LBPV pyramids by Feiniu Yuan (School of information Technology, Jianxi University of Finance and Economics, Nanchang 330032, Jianxi, China) pp. 8; Available online Jan. 20, 2011.*

A Fully Statistical Framework for Shape Detection in Image Primitives by Jingyong Su, Zhiqiang Zhu, Anuj Srivastava and Fred Huffer (Florida State University, Tallahassee, FL) Pages: IEEE Publication Date: (Year: 2010).*

International Search Report (PCT/ISA/210) issued in PCT Application No. PCT/JP2014/065778 dated Sep. 16, 2014 with English translation (Two (2) pages).

* cited by examiner

Fig 2

COMMUNICATION QUALITY-BASED DISPLAY RULE STORAGE UNIT 1 4 2

| COMMUNICATION QUALITY (PACKET LOSS PERCENTAGE) 1 4 2 A | WARNING DISPLAY 1 4 2 B | NORMAL DISPLAY 1 4 2 C | WARNING CONTENT 1 4 2 D |
|---|---|---|---|
| | | | |

Fig 3

STATE-BASED FUNCTION RESTRICTION STORAGE UNIT 1 4 3

| 1 4 3 A | 1 4 3 B | 1 4 3 C | 1 4 3 D | 1 4 3 E | 1 4 3 F |
|---|---|---|---|---|---|
| STATE | RECORDING PERMISSION | IMAGE RECOGNITION PERMISSION | POSITION DETECTION PERMISSION | MOBILE TERMINAL LINK PERMISSION | OPERATION DETECTION PERMISSION |
|  |  |  |  |  |  |

WORK RECORDING APPARATUS, SYSTEM, PROGRAM, AND METHOD PREVENTING CONFIDENTIAL INFORMATION LEAKS

TECHNICAL FIELD

The present invention relates to a work recording apparatus, a work recording system, a work recording program, and a work recording method.

BACKGROUND ART

In Patent Literature 1, there is disclosed a mobile communication terminal apparatus configured to issue an announcement with announcement means when an incoming call is received, the mobile communication terminal apparatus including a memory unit storing a setting table in which incoming call operations of the announcement means are individually set based on a location, position information acquisition means for acquiring current position information, map information acquisition means for acquiring map information based on the current position information, and control means for specifying the location where the mobile communication terminal apparatus is located by collating the current position information with the map information, and reading and setting from the setting table the incoming call operation of the announcement means corresponding to the specified location.

CITATION LIST

Patent Literature

[PTL 1] Japanese Patent Laid-open Publication No. 2008-206017

SUMMARY OF INVENTION

Technical Problem

With the above-mentioned technology, although it is possible to control the incoming call operation based on a position, in situations in which there is a fear of confidential information leaking and the like, it is difficult to properly prevent the leaking of confidential information from information about a work record acquired by a worker and the like in such a situation.

It is an object of the present invention to provide a technology for preventing the leaking of confidential information more properly.

Solution to Problem

This application includes a plurality of means for solving at least a part of the problem described above. Examples of those means areas follows. In order to solve the above-mentioned problem, according to one embodiment of the present invention, there is provided a work recording apparatus including: a recording control unit configured to record a work situation; a position detection unit configured to detect a position; and a usable function restriction unit configured to specify an applicable predetermined state through use of the position detected by the position detection unit and restrict a part or all of functions of the recording control unit based on the specified applicable predetermined state.

Further, the work recording apparatus may further include: a storage unit; and a data encryption unit configured to receive recording key information, use the recording key information to encrypt the work situation recorded by the recording control unit, and store the encrypted work situation in the storage unit, and the data encryption unit maybe configured to decrypt the encrypted work situation when the recording key information is received during reading of the encrypted work situation from the storage unit.

Further, in the work recording apparatus: the recording control unit may be configured to generate and record video information by capturing images of the work; the work recording apparatus may further include a mark detection unit configured to detect a predetermined image in the video information generated by the recording control unit; and the usable function restriction unit may be configured to release the restriction when the mark detection unit detects the predetermined image.

Further, the work recording apparatus may further include a mount/dismount detection unit configured to detect mounting and dismounting of the work recording apparatus by a wearer onto and off a body of the wearer, and the usable function restriction unit may be configured to restrict the functions during a period in which the mounting is not detected by the mount/dismount detection unit and release the restriction during a period in which the mounting is detected.

Further, the work recording apparatus may further include a predetermined light-emitting unit, and the recording control unit may be configured to control the predetermined light-emitting unit to perform a predetermined output during a period in which the work situation is being recorded.

Further, according to one embodiment of the present invention, there is provided a work recording system including: a work recording apparatus; a terminal to be communicably connected to the work recording apparatus; and a management apparatus configured to perform communication to/from the terminal, the work recording apparatus including: a recording control unit configured to acquire a work situation and transmit the acquired work situation to the terminal; a position detection unit configured to detect a position; and a usable function restriction unit configured to specify an applicable predetermined state through use of the position detected by the position detection unit and restrict a part or all of functions of the recording control unit based on the specified applicable predetermined state, the terminal including: a recording key input reception unit configured to receive an input of a recording key; an encryption unit configured to use the recording key to encrypt information about the work transmitted by the recording control unit; a display unit configured to use the recording key to decrypt and display the information about the work encrypted by the encryption unit when an input of the recording key is received; a confirmation input reception unit configured to receive a confirmation input of the information about the work; and a communication unit configured to transmit to the management apparatus the information about the work for which the confirmation input has been received by the confirmation input reception unit, the management apparatus including a storage unit configured to store the received information about the work.

Further, in the work recording system: the work recording apparatus may further include: an inner side display unit that is visible to at least a wearer; and an outer side display unit mounted to a position that is externally visible; and the work recording apparatus may be configured to display predetermined video information on the inner side display unit based on a communication situation between the terminal and the management apparatus.

Further, according to one embodiment of the present invention, there is provided a work recording system including: a work recording apparatus; a terminal to be communicably connected to the work recording apparatus; and a management apparatus configured to perform communication to/from the terminal, the work recording apparatus including: a recording control unit configured to acquire a work situation and transmit the acquired work situation to the terminal; a position detection unit configured to detect a position; and a usable function restriction unit configured to specify an applicable predetermined state through use of the position detected by the position detection unit and restrict a part or all of functions of the recording control unit based on the specified applicable predetermined state, the terminal including: a recording key input reception unit configured to receive an input of a recording key; an encryption unit configured to use the recording key to encrypt information about the work transmitted by the recording control unit; and a communication unit configured to transmit to the management apparatus the encrypted information about the work, the management apparatus including: a storage unit configured to store the received encrypted information about the work; an output unit configured to use the recording key to decrypt and output the encrypted information about the work stored in the storage unit when an input of the recording key is received; a confirmation input reception unit configured to receive a confirmation input of the information about the work; and a decryption and storage unit configured to use the recording key to decrypt encrypted information of the information about the work for which the confirmation input has been received by the confirmation input reception unit, and store the decrypted information about the work in the storage unit.

Further, according to one embodiment of the present invention, there is provided a work recording program for causing a computer to execute processing of recording work, the work recording program being configured to cause the computer to function as control means, the work recording program being configured to cause the control means to execute: a recording control step of recording a work situation; a position detection step of detecting a position; and a usable function restriction step of specifying an applicable predetermined state through use of the position detected in the position detection step and restricting a part or all of functions executed in the recording control step based on the specified applicable predetermined state.

Further, according to one embodiment of the present invention, there is provided a work recording method for recording work through use of a computer, the work recording method including executing, by the computer: a recording control step of recording a work situation; a position detection step of detecting a position; and a usable function restriction step of specifying an applicable predetermined state through use of the position detected in the position detection step and restricting a part or all of functions executed in the recording control step based on the specified applicable predetermined state.

Further, according to one embodiment of the present invention, there is provided a work recording method using a work recording system, the work recording system including: a work recording apparatus; a terminal to be communicably connected to the work recording apparatus; and a management apparatus configured to perform communication to/from the terminal, the work recording method including: executing, by the work recording apparatus: a recording control step of acquiring a work situation and transmitting the acquired work situation to the terminal; a position detection step of detecting a position; and a usable function restriction step of specifying an applicable predetermined state through use of the position detected in the position detection step and restricting a part or all of functions in the recording control step based on the specified applicable predetermined state; executing, by the terminal: a recording key input reception step of receiving an input of a recording key; an encryption step of using the recording key to encrypt information about the work transmitted in the recording control step; a display step of using the recording key to decrypt and display the information about the work encrypted in the encryption step when an input of the recording key is received; a confirmation input reception step of receiving a confirmation input of the information about the work; and a communication step of transmitting to the management apparatus the information about the work for which the confirmation input has been received in the confirmation input reception step; and executing, by the management apparatus, a storage step of storing the received information about the work in a predetermined storage unit.

Advantageous Effects of Invention

According to one embodiment of the present invention, the technology for preventing the leaking of confidential information more properly can be provided. However, problems, configurations, and advantageous effects other than those described above are clarified below based on the description of the following embodiment.

BRIEF DESCRIPTION OF DRAWINGS

FIG. 2 shows an example of a data structure stored in a communication quality-based display rule storage unit.

FIG. 3 shows an example of a data structure stored in a state-based function restriction storage unit.

DESCRIPTION OF EMBODIMENT

An embodiment using a work recording system 1 to which a first embodiment according to the present invention is applied is described below with reference to the drawings.

Figure 1:
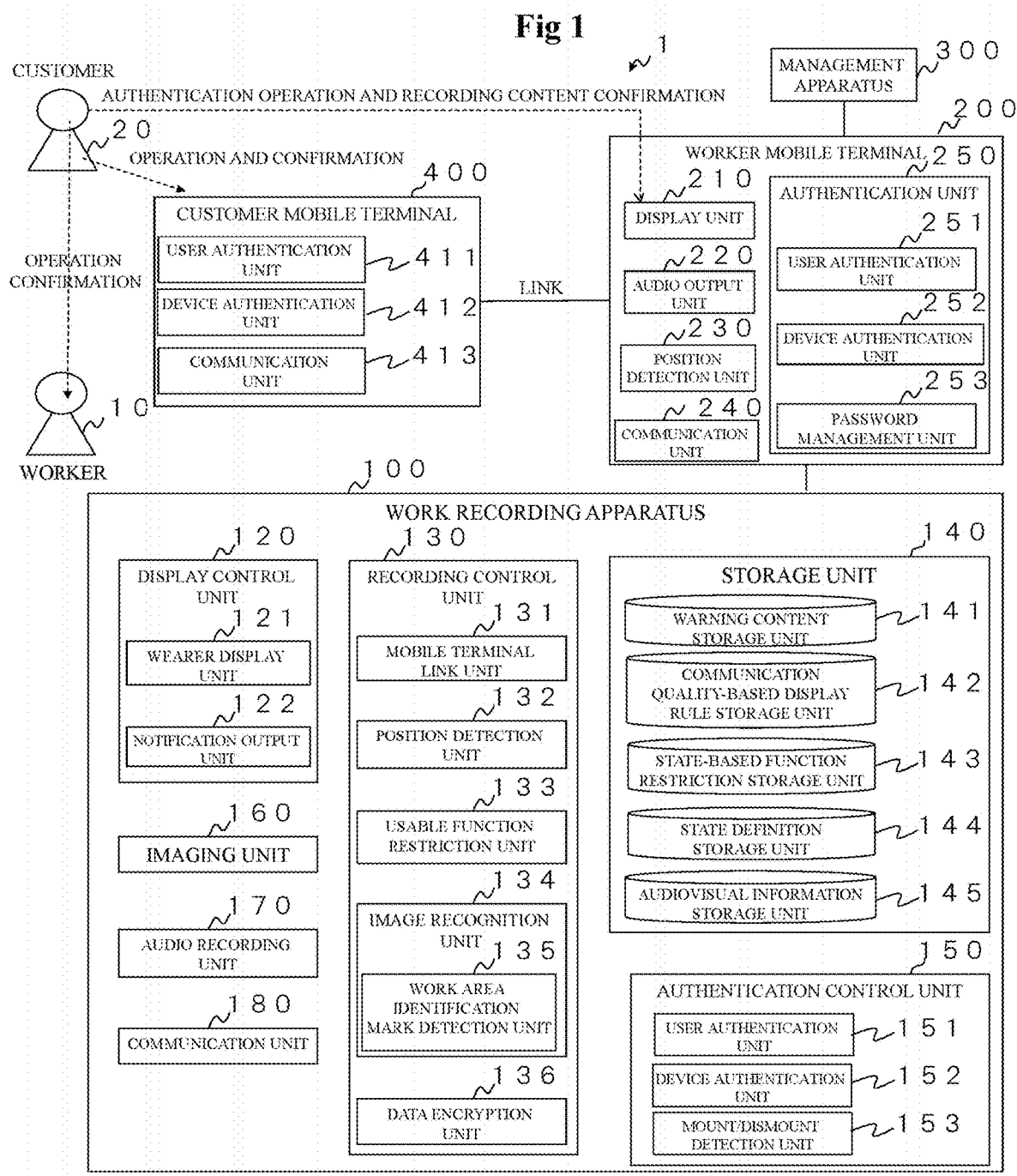
FIG. 1 illustrates a configuration example of a work recording system according to an embodiment of the present invention.

FIG. 1 illustrates a configuration example of a work recording system according to the first embodiment of the present invention. The work recording system 1 according to this embodiment includes a work recording apparatus 100, a worker mobile terminal 200, a management apparatus 300, and a customer mobile terminal 400. Note that, the worker mobile terminal 200 may be a mobile terminal owned by a worker 10 using the work recording apparatus 100, or may be a mobile terminal lent to the worker 10 from an organization that the worker 10 belongs to. Further, the customer mobile terminal 400 may be a mobile terminal owned by a customer 20 having a role of managing a target on which work is to be performed by the worker 10 using the work recording apparatus 100, or may be a mobile terminal lent to the customer 20 from an organization that the customer 20 belongs to.

The work recording apparatus 100 is, for example, a computer in the form of a pair of glasses or the like, which is removably attached to a part of the body of the worker. The work recording apparatus 100 is also referred to as a so-called wearable device. It is preferred that the work recording apparatus 100 be mounted on the worker, be capable of acquiring video information having the same or a wider-angle visual field than the worker, and be capable of acquiring audio information perceived by the worker.

The worker mobile terminal 200 is, for example, a so-called personal computer, or a mobile terminal (e.g., a smartphone, a tablet, a tethering terminal) having an information processing function. Note that, the worker mobile terminal 200 is capable of communicating to/from the management apparatus 300 via a public network, such as a mobile phone network or the Internet. The management apparatus 300 is a so-called server apparatus, personal computer device, or the like. Further, the customer mobile terminal 400 is, for example, a so-called personal computer, or a mobile terminal (e.g., a smartphone) having an information processing function. Note that, it is preferred that, although not limited to, the customer mobile terminal 400 be capable of communicating to/from the worker mobile terminal 200 via a wireless local area network (LAN) or Bluetooth (trademark).

The work recording apparatus 100 and the worker mobile terminal 200 are communicably connected to the worker mobile terminal 200 via a communication channel such as a wireless LAN, Bluetooth, a universal serial bus (USB) connection, or the like.

In the work recording system 1, the worker 10 performs maintenance and management work on a target device or a piece of target equipment that is owned or managed by the customer 20. When the worker 10 has attached the work recording apparatus 100 to his/her body, and connected the work recording apparatus 100 to the worker mobile terminal 200 that he/she is carrying, a work record containing video and audio is acquired using the work recording apparatus 100. Note that, the acquired work record often includes information that should be confidentially managed, such as information about system equipment of the customer 20. Thus, storing the acquired information in a manner that allows the information to be read to an external management apparatus 300 without the approval of the customer 20 may lead to leaking of confidential information.

Therefore, the work recording system 1 realizes the following work model. Specifically, the worker 10 asks the customer 20 to confirm the content of the work record. If there is no problem with the content of the work record, the worker 10 receives approval from the customer 20, and the worker 10 transmits the work record in a readable manner to the management apparatus 300 from the worker mobile terminal 200 to which the work record has been transferred from the work recording apparatus 100.

Note that, this model assumes that the customer 20 inputs a recording key, for example, into the worker mobile terminal 200. However, due to reasons such as there is no way to confirm whether or not the worker mobile terminal 200 of the worker 10 is sufficiently reliable, the customer 20 may feel that there is a security risk. In order to cast aside this feeling, the customer 20 may perform a customer input operation with use of the customer mobile terminal 400 that the customer 20 itself manages.

In such a case, the customer mobile terminal 400 establishes communication to/from the worker mobile terminal 200 and performs device authentication, and the input of the recording key, the confirmation of the content of the work record, and the approval of the work record are performed using the customer mobile terminal 400.

The work recording apparatus 100 includes a display control unit 120, a recording control unit 130, a storage unit 140, an authentication control unit 150, an imaging unit 160, an audio recording unit 170, and a communication unit 180. The display control unit 120 is configured to control processing relating to display of the work recording apparatus 100. The display control unit 120 includes a wearer display unit 121 configured to control a visual display or an audio output to the worker 10, who is the wearer, and a notification output unit 122 configured to control a visual display or an audio output other than to the wearer. The wearer display unit 121 is an inner side display unit that is configured to display information superimposed on optical video through a lens to the wearer by projecting an image of visual display information onto the lens surface that is nearer to the wearer of the pair of glasses, for example. The notification output unit 122 is an outer side display unit configured to show the customer 20 and the like, who is capable of visually recognizing the wearer externally, that the work recording apparatus 100 is being operated by controlling the blinking of a light-emitting body, such as a Light-Emitting diode (LED), for example.

The recording control unit 130 includes a mobile terminal link unit 131, a position detection unit 132, a usable function restriction unit 133, an image recognition unit 134, and a data encryption unit 136. The mobile terminal link unit 131 is configured to control data communication to/from the worker mobile terminal 200. The position detection unit 132 is configured to specify the position where the work recording apparatus 100 is located, and acquire that position as position information. The usable function restriction unit 133 is configured to restrict a part of the recording functions that the recording control unit 130 of the work recording apparatus 100 has based on the position information and the like. In other words, the usable function restriction unit 133 is configured to use the position detected by the position detection unit 132 to specify an applicable state from among predetermined states, and restrict apart or all of the functions of the recording control unit 130 based on the specified state.

The image recognition unit 134 performs predetermined image recognition by analyzing video information captured by the imaging unit 160. For example, the image recognition unit 134 realizes authentication involving facial recognition of a subject, and device specification based on matching with features of the device. In particular, the image recognition unit 134 includes a work area identification mark detection unit 135. The work area identification mark detection unit 135 transfers the video information captured by the imaging unit 160 to the storage unit 140 as audiovisual information only when an image including a predetermined pattern is included in the screen.

The data encryption unit 136 is configured to encrypt the video information captured by the imaging unit 160 based on a recording key.

The storage unit 140 includes a warning content storage unit 141, a communication quality-based display rule storage unit 142, a state-based function restriction storage unit 143, a state definition storage unit 144, and an audiovisual information storage unit 145.

In the warning content storage unit 141, messages resulting from a deterioration in the communication state are stored, such as a message indicating that the quality of communication between the worker mobile terminal 200 and the management apparatus 300 has deteriorated, and a message indicating that due to communication having been cut off, the work recording apparatus 100 is to operate in a stand-alone manner until communication is restored. Note that, the displayed messages are not limited to messages resulting from deterioration in the communication state, and various kinds of messages notifying that work recording using the work recording apparatus 100 may not be carried out normally may be displayed, such as a message warning that work recording is to be cut off due to the work recording apparatus 100 running out of power, for example.

FIG. 2 shows an example of a data structure stored in the communication quality-based display rule storage unit 142. In the communication quality-based display rule storage unit 142, a communication quality (packet loss percentage) 142A, a warning display 142B, a normal display 142C, and warning content 142D are associated with one another. The communication quality (packet loss percentage) 142A is information that delimits in predetermined intervals the ratio of the number of lost packets to the total number of packets transmitted and received in communication between the worker mobile terminal 200 and the management apparatus 300. For example, a record is registered in the communication quality (packet loss percentage) 142A for each section, such as "less than 10%", "10% or more to less than 50%", and "50% or more".

The warning display 142B stores a value indicating whether or not to perform a warning display based on the sections of the communication quality (packet loss percentage) 142A. The normal display 142C stores a value indicating whether or not to perform a normal display based on the sections of the communication quality (packet loss percentage) 142A. The warning content 142D stores information specifying the warning content to be displayed of the warning content stored in the warning content storage unit 141, when the value in the warning display 142B indicates that a warning display is to be performed.

FIG. 3 shows an example of a data structure stored in the state-based function restriction storage unit 143. In the state-based function restriction storage unit 143, a recording permission 143B, an image recognition permission 143C, a position detection permission 143D, a mobile terminal link permission 143E, and an operation detection permission 143F are associated with a state 143A.

The state 143A stores information specifying the applicable state from among predetermined states regarding the state that the work recording apparatus 100 and the worker 10 are in. Those states are defined in the state definition storage unit 144.

The recording permission 143B is information specifying whether or not a recording function is to be permitted in the state specified by the state 143A. Note that, recording refers to, for example, the acquisition of video information obtained by imaging and fixing, including temporary fixing, of the acquired video information on a recording medium, or the acquisition of audio information obtained by sound collecting and fixing, including temporary fixing, of the acquired audio information on a recording medium, or the acquisition and fixing, including temporary fixing, of video information and audio information on a recording medium.

The image recognition permission 143C is information specifying whether or not an image recognition function is to be permitted in the state specified by the state 143A. Note that, image recognition includes processing for identifying, from among video information acquired by capturing images, an object in an image from other objects included in the image, for example.

The position detection permission 143D is information specifying whether or not position detection is to be permitted in the state specified by the state 143A. Note that, position detection includes processing for identifying the position where the work recording apparatus 100 is located using position information acquired by position measurement using satellite waves from a global positioning system (GPS), a global navigation satellite system (GLONASS), or the like.

The mobile terminal link permission 143E is information specifying whether or not linked communication to/from a mobile terminal is to be permitted in the state specified by the state 143A. Note that, linking to/from the mobile terminal includes processing for communicating to/from the worker mobile terminal 200 via connection means such as a wireless LAN, Bluetooth, or USB.

The operation detection permission 143F is information specifying whether or not detection of an operation by the worker 10 is to be permitted in the state specified by the state 143A. Note that, detection of an operation by the worker 10 includes processing for detecting an operation based on vibration, acceleration, and the like detected by the work recording apparatus 100, for example.

Figure 4:
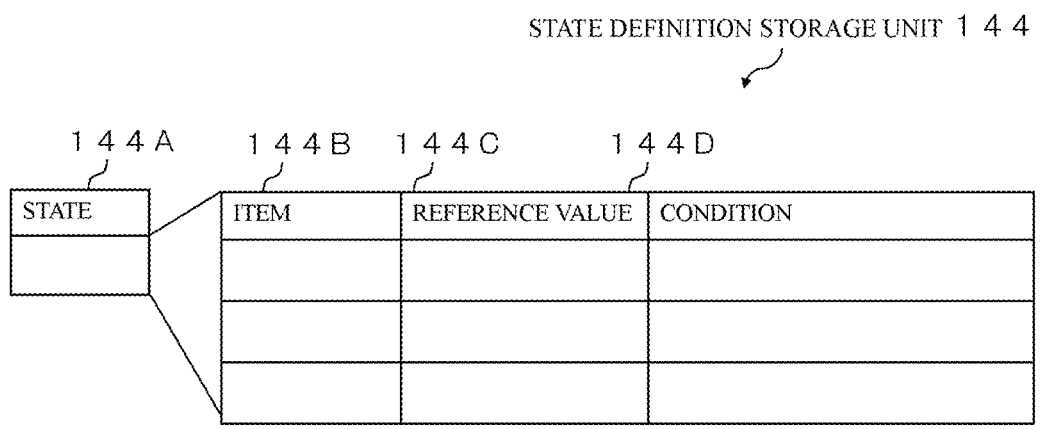
FIG. 4 shows an example of a data structure stored in a state definition storage unit.

FIG. 4 shows an example of a data structure stored in the state definition storage unit 144. In the state definition storage unit 144, an item 144B, a reference value 144C, and a condition 144D are associated with a state 144A.

The state 144A stores information specifying predetermined states regarding the state that the work recording apparatus 100 and the worker 10 are in. For example, information specifying a state in which the worker 10 has mounted the work recording apparatus 100 and user authentication has been successful is stored in the state 144A.

A parameter item defining the state 144A is stored in the item 144B. For example, an item such as the mounted state of the work recording apparatus 100 by the worker 10, the fact that user authentication by the worker 10 for the work recording apparatus 100 has been successful, the position of the work recording apparatus 100, whether or not a predetermined mark is present in video acquired by the work recording apparatus 100, a level of user operations, or whether or not a recording key is set by the customer 20 are stored in the state 144A.

A value serving as a reference regarding the item 144B is stored in the reference value 144C. For example, when the mounted state of the work recording apparatus 100 by the worker 10 is stored in the item 144B, a value indicating that the work recording apparatus 100 is mounted is stored in the reference value 144C. Further, for example, when the fact that authentication by the worker 10 for the work recording apparatus 100 has been successful is stored in the item 144B, a value indicating a successful authentication state is stored in the reference value 144C. Still further, for example, when the position of the work recording apparatus 100 is stored in the item 144B, information specifying the region that the place where the work is to be carried out belongs to is stored in the reference value 144C. Still more further, for example, when whether or not a predetermined mark is present in video acquired by the work recording apparatus 100 is stored in the item 144B, a value indicating that the mark is present is stored in the reference value 144C. Still even further, for example, when the level of user operations is stored in the item 144B, a value indicating that user operations are faster than a predetermined level is stored in the reference value 144C. Moreover, for example, when whether or not a recording key is set by the customer 20 is stored in the item 144B, a value indicating that a recording key has been set by the customer 20 is stored in the reference value 144C.

A relationship to assure that an actually measured value satisfies the condition of the item with respect to the reference value 144C is stored in the condition 144D. For example, information indicating a condition such as "less than", "equal to or more than", "equal to", and "different to", is stored in the condition 144D.

Returning to the description of FIG. 1, a work record containing video or audio obtained by the work recording apparatus 100 is stored in the audiovisual information storage unit 145.

The authentication control unit 150 includes a user authentication unit 151 configured to determine whether or not use of the work recording apparatus 100 is by the proper user, a device authentication unit 152 configured to indicate to the connected worker mobile terminal 200 that use is by the correct apparatus, and is not impersonation, and a mount/dismount detection unit 153 configured to detect mounting/dismounting of the work recording apparatus 100 onto/off the worker.

The mount/dismount detection unit 153 is configured to determine, for example, whether or not the worker 10 has mounted the work recording apparatus 100.

The imaging unit 160, which is mounted at a predetermined angle with respect to the work recording apparatus 100, is configured to acquire optical video. Note that, the captured video is not limited to optical video. For example, the captured video may be digitally-processed video, or video acquired from images representing a temperature distribution obtained by measuring changes in temperature for a predetermined range by infrared thermography. Further, although it is preferred that the acquired video be formed from moving images, the video is not limited to moving images, and may be still images acquired at predetermined intervals.

The audio recording unit 170 is configured to acquire audio information by collecting sound from around the work recording apparatus 100. Note that, the audio information is acquired as a digital signal by analog-digital conversion.

The communication unit 180 is configured to control communication between the work recording apparatus 100 and the worker mobile terminal 200. It is preferred that the communication unit 180 be configured to control, for example, near field radio communication based on Bluetooth, a wireless LAN, near field communication (NFC), or the like. However, the communication unit 180 may also be configured to control a predetermined wired communication, such as USB.

The worker mobile terminal 200 includes a display unit 210, an audio output unit 220, a position detection unit 230, a communication unit 240, and an authentication unit 250. The display unit 210 is configured to display output information, which is a result of processing performed by the worker mobile terminal 200. Note that, the display unit 210 also includes an input unit configured to receive input information, such as recording key information from a user, based on contact input.

The audio output unit 220 is configured to output audio output information, which is a result of processing performed by the worker mobile terminal 200.

The position detection unit 230 is configured to detect the position where the worker mobile terminal 200 is located, and output the detected position based on predetermined coordinate information and the like.

The communication unit 240 is configured to communicate to/from other apparatus, such as the work recording apparatus 100, the management apparatus 300, and the customer mobile terminal 400. It is preferred that the communication unit 240 be configured to control, for example, near field radio communication based on Bluetooth, a wireless LAN, NFC, or the like. However, the communication unit 180 may also be configured to control predetermined wired communication, such as USB or LAN.

The authentication unit 250 includes a user authentication unit 251 configured to determine whether or not use of the worker mobile terminal 200 is by the proper user, a device authentication unit 252 configured to indicate to the connected work recording apparatus 100 or customer mobile terminal 400 that use is by the correct apparatus, and is not impersonation, and a password management unit 253 configured to manage the passwords used for user authentication of the connected work recording apparatus 100 or the customer mobile terminal 400.

The management apparatus 300 is connected to the worker mobile terminal 200 via a network. The management apparatus 300, which includes a storage unit configured to store information transmitted from the worker mobile terminal 200, operates as a so-called server apparatus.

The customer mobile terminal 400 is an information processing apparatus, such as a smartphone or a tablet, which is basically managed by the customer 20.

The customer mobile terminal 400 includes a user authentication unit 411 configured to determine whether or not use of the customer mobile terminal 400 is by the correct user, a device authentication unit 412 configured to indicate to the connected worker mobile terminal 200 that use is by the correct apparatus, and is not impersonation, and a communication unit 413 configured to communicate to/from other apparatus, such as the worker mobile terminal 200.

Figure 5:
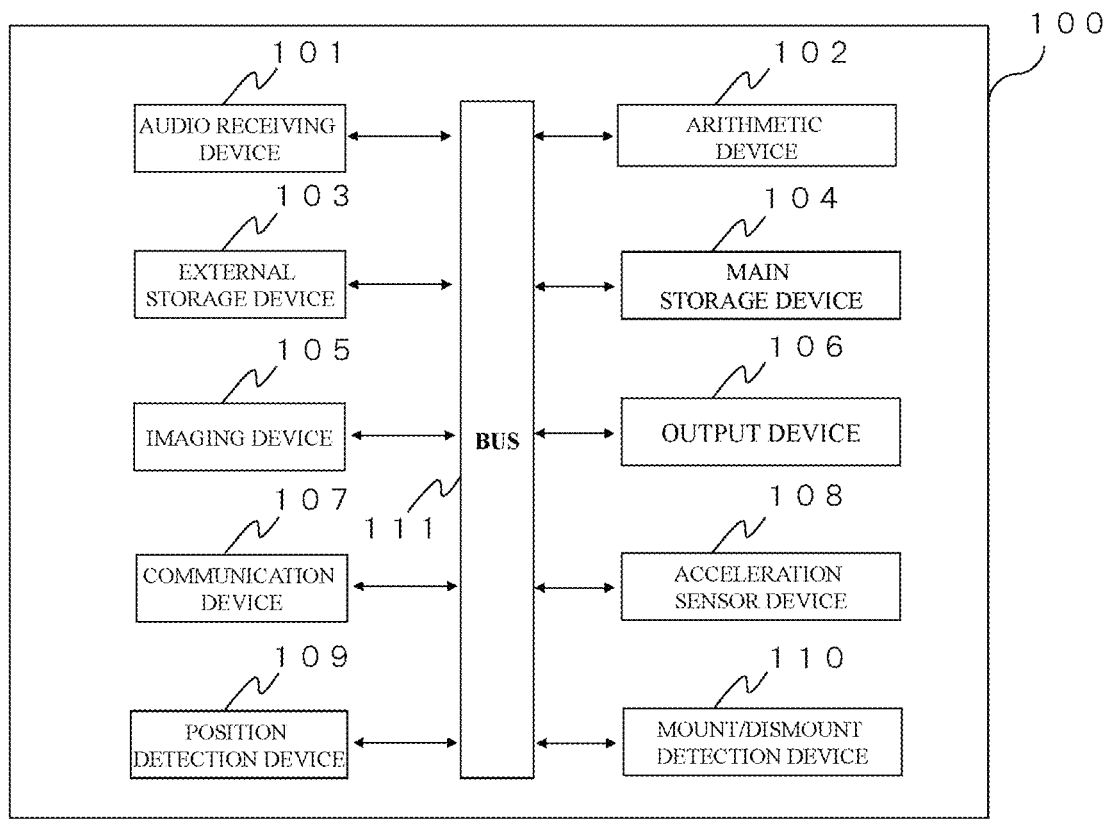
FIG. 5 illustrates a hardware configuration of a work recording apparatus.

FIG. 5 illustrates a hardware configuration of the work recording apparatus 100. The work recording apparatus 100 includes at least an audio receiving device 101, an arithmetic device 102, an external storage device 103, a main storage device 104, an imaging device 105, an output device 106, a communication device 107, an acceleration sensor device 108, a position detection device 109, a mount/dismount detection device 110, and a bus 111 configured to connect the respective devices. In addition, the work recording apparatus 100 may also include a contact input device. Note that, for example, in the case of a wearable device in the form of a pair of glasses, the contact input device may be configured to, although is not limited to, receive a touch on a temple portion of the pair of glasses as a click input, and receive a touch made in a sliding direction as a scroll input.

The audio receiving device 101 is configured to collect sound, including spoken sound produced by the worker wearing the work recording apparatus 100, and ambient sound. For example, the audio receiving device 101 is one or a plurality of microphones.

The arithmetic device 102 is, for example, an arithmetic device such as a central processing unit (CPU).

The external storage device 103 is a non-volatile external storage device, such as a so-called flash memory, that is capable of storing digital information.

The main storage device 104 is, for example, a memory such as a random access memory (RAM).

The imaging device 105 is a camera device configured to acquire video information having the same or a wider-angle visual field than the worker wearing the work recording apparatus 100.

The output device 106 is a display device, such as a light-emitting device configured to emit light so that the light is externally visible, a projection device configured to project an image on an optical lens surface so that the image can be seen by the wearer, or a semi-transmissive display device provided based on the optical lens surface. However, the output device 106 is not limited to those examples, and may be, for example, a display device capable of radiating light so as to form an image on the retina of the worker.

The communication device 107 is a device configured to transmit and receive information by establishing a communication channel to/from other apparatus, such as the worker mobile terminal 200, via a wireless network and the like.

The acceleration sensor device 108 is a device configured to detect changes in the movement and orientation of the worker 10, who is the wearer, by specifying an acceleration direction and a magnitude of acceleration by acquiring acceleration in a predetermined dimension.

The position detection device 109 is a device configured to receive satellite waves transmitted from three or more satellites, such as GPS satellites, using an antenna, and calculate the three-dimensional coordinates of the current location based on the received information.

The mount/dismount detection device 110 is a device configured to specify whether or not the worker 10 has mounted, or has removed, the work recording apparatus 100. For example, the work recording apparatus 100 may be configured to include electrodes on the temples of a pair of glasses, and specify that the work recording apparatus 100 is mounted when there is an object (i.e., a person's head) connecting the electrodes on the temples, and specify that the work recording apparatus 100 has been removed when there is not an object connecting the electrodes.

The above-mentioned display control unit 120 of the work recording apparatus 100 is realized by the output device 106. The recording control unit 130 and the authentication control unit 150 are realized by a program for causing the arithmetic device 102 to perform processing. This program is stored in the main storage device 104, the external storage device 103, or a ROM apparatus (not shown). For execution, the program is loaded into the main storage device 104, and executed by the arithmetic device 102. Further, the position detection unit 132 is realized by the position detection device 109. In addition, the mount/dismount detection unit 153 is realized by the mount/dismount detection device 110.

The storage unit 140 of the work recording apparatus 100 is realized by the main storage device 104 and the external storage device 103. The imaging unit 160 of the work recording apparatus 100 is realized by the imaging device 105. The audio recording unit 170 of the work recording apparatus 100 is realized by the audio receiving device 101. The communication unit 180 of the work recording apparatus 100 is realized by the communication device 107.

The hardware configuration example of the work recording apparatus 100 is described above. Note that, the worker mobile terminal 200 and the customer mobile terminal 400 also have, with some differences in shape and configuration, roughly the same hardware configuration as the work recording apparatus 100, and hence a detailed description thereof is omitted.

Note that, the display unit 210 of the worker mobile terminal 200 is realized by the output device 106. The audio output unit 220 is realized by a speaker device (not shown). The position detection unit 230 is realized by the position detection device 109. The communication unit 240 is realized by the communication device 107. The authentication unit 250 is realized by a program for causing the arithmetic device 102 to perform processing. This program is stored in the main storage device 104, the external storage device 103, or a ROM device (not shown). For execution, the program is loaded into the main storage device 104, and executed by the arithmetic device 102.

The user authentication unit 411 and the device authentication unit 412 of the customer mobile terminal 400 are realized by a program for causing the arithmetic device 102 to perform processing. This program is stored in the main storage device 104, the external storage device 103, or a ROM device (not shown). For execution, the program is loaded into the main storage device 104, and executed by the arithmetic device 102. The communication unit 413 is realized by the communication device 107.

Further, the management apparatus 300 also has, with some differences in the size and included technical elements for a part of the configuration, roughly the same hardware configuration, and hence a detailed description thereof is omitted.

Note that, each of the configurations of the work recording apparatus 100, the worker mobile terminal 200, and the management apparatus 300 may be classified into even more constituent elements based on the processing content. Further, one constituent element may also be classified so as to execute even more processes.

In addition, each control unit may be built from hardware (an ASIC, GPU, etc.). Still further, the processing of each control unit may be executed by one piece of hardware, or by a plurality of pieces of hardware.

[Operation Description]

Figure 6:
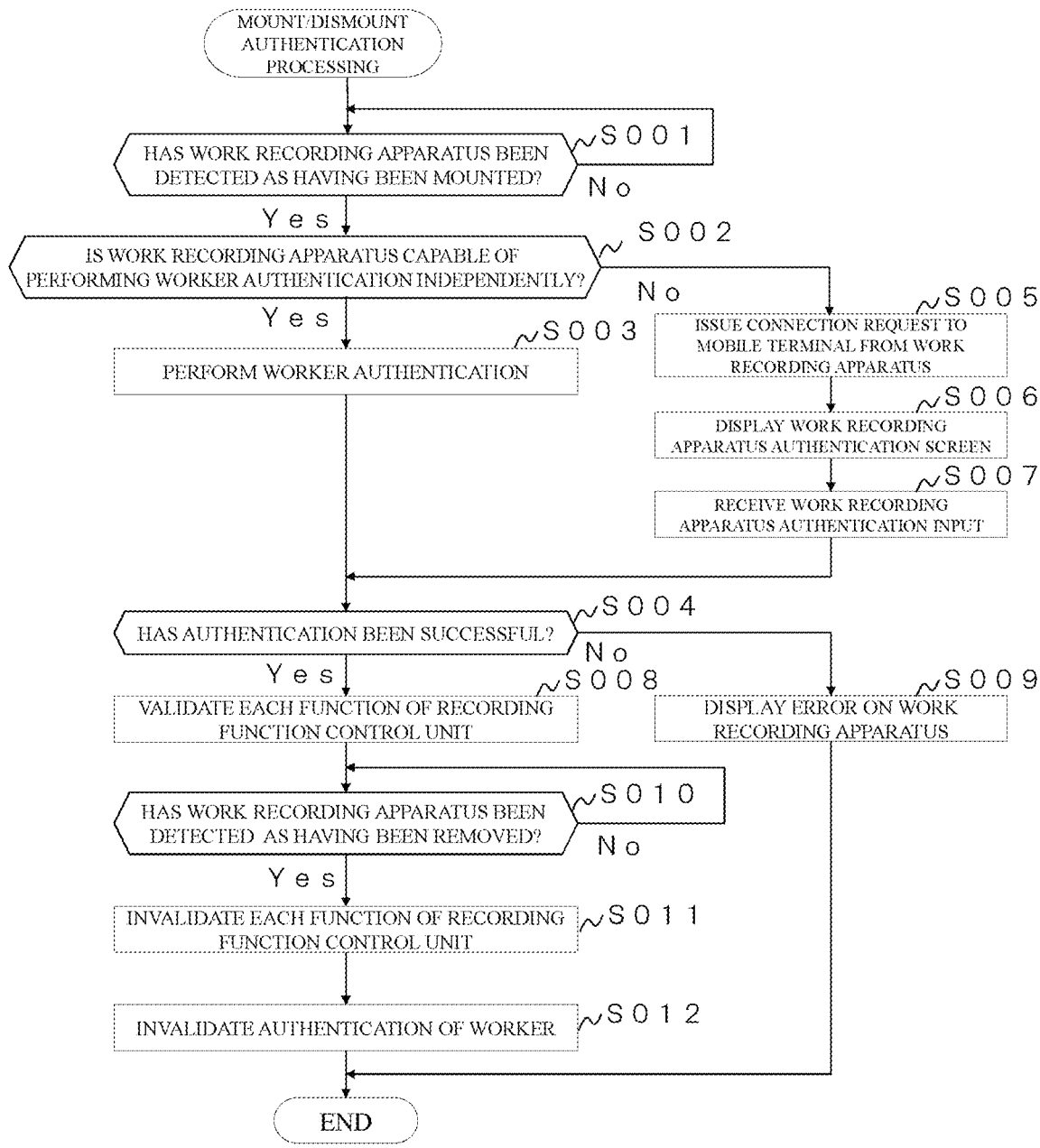
FIG. 6 illustrates a flow of mount/dismount authentication processing.

Next, operation of the work recording system 1 according to this embodiment is described. FIG. 6 is a flow diagram of mount/dismount authentication processing according to this embodiment.

The mount/dismount authentication processing is started when the work recording apparatus 100 starts.

First, the mount/dismount detection unit 153 determines whether or not it has been detected that the work recording apparatus 100 has been mounted by the worker 10 (Step S001). Specifically, the mount/dismount detection unit 153 determines whether or not the work recording apparatus 100 is in amounted state by confirming an energization state and the like of the mount/dismount detection device 110. When the work recording apparatus 100 is not in a mounted state ("No" in Step S001), the mount/dismount detection unit 153 performs Step S001 again.

When it is detected that the work recording apparatus 100 has been mounted ("Yes" in Step S001), the user authentication unit 151 determines whether or not the work recording apparatus 100 is capable of performing worker authentication independently (Step S002). Specifically, the user authentication unit 151 determines whether or not an ID, a password, and the like have been registered in the work recording apparatus 100 for user authentication.

When the user authentication unit 151 is capable of performing worker authentication ("Yes" in Step S002), the user authentication unit 151 performs authentication of the worker 10 (Step S003). Specifically, the user authentication unit 151 performs authentication of the worker 10 by receiving a password from the worker 10, and comparing the received password with a predetermined password.

Then, the user authentication unit 151 determines whether or not authentication has been successful (Step S004). Specifically, the user authentication unit 151 determines that authentication has been successful when the result of password comparison is that the passwords match.

When it is determined that the user authentication unit 151 is not capable of performing worker authentication ("No" in Step S002), the device authentication unit 152 issues a connection request to the worker mobile terminal 200 (Step S005).

Then, the device authentication unit 252 of the worker mobile terminal 200 transmits information to the work recording apparatus 100 requesting that an authentication screen be displayed, and issues an instruction to execute authentication (Step S006).

Then, the user authentication unit 251 receives an input of the information needed for authentication via the user authentication unit 151 of the work recording apparatus 100 (Step S007), and the user authentication unit 251 proceeds the processing to Step S004.

When authentication is successful ("Yes" in Step S004), the usable function restriction unit 133 validates each function of the recording control unit 130 (Step S008). Specifically, the usable function restriction unit 133 sets various usable function units of the recording control unit 130 to an operable state.

When the authentication performed in Step S003 is not successful ("No" in Step S004), the usable function restriction unit 133 displays an error on the work recording apparatus 100 (Step S009). Specifically, the usable function restriction unit 133 generates screen information containing a message notifying that a predetermined authentication error has occurred, transmits the generated screen information to the work recording apparatus 100, and finishes the mount/dismount authentication processing.

Then, the mount/dismount detection unit 153 determines whether or not it has been detected that the work recording apparatus 100 has been removed from the worker 10 (Step S010). Specifically, the mount/dismount detection unit 153 determines whether or not the work recording apparatus 100 is in a dismounted state by confirming the energization state and the like of the mount/dismount detection device 110. When the work recording apparatus 100 is in a dismounted state ("No" in Step S010), the mount/dismount detection unit 153 performs Step S010 again.

When it is detected that the work recording apparatus 100 has been removed from the worker 10 ("Yes" in Step S010), the usable function restriction unit 133 invalidates each function of the recording control unit 130 (Step S011). Specifically, the usable function restriction unit 133 sets, among the various usable function units of the recording control unit 130, the operating function units to an inoperable state.

Then, the user authentication unit 151 invalidates authentication of the worker 10 (Step S012). Specifically, the user authentication unit 151 changes the authentication state of the worker 10 to a non-authenticated state.

The processing flow of the mount/dismount authentication processing is described above. According to the mount/dismount authentication processing, authentication is performed when the worker 10 mounts the work recording apparatus 100. When authentication is successful, the work recording apparatus 100 is set so that the various recording functions are usable. Further, when the work recording apparatus 100 is removed from the worker 10, the authentication state is released, and the work recording apparatus 100 can be set so that the various recording functions cannot be used.

Figure 7:
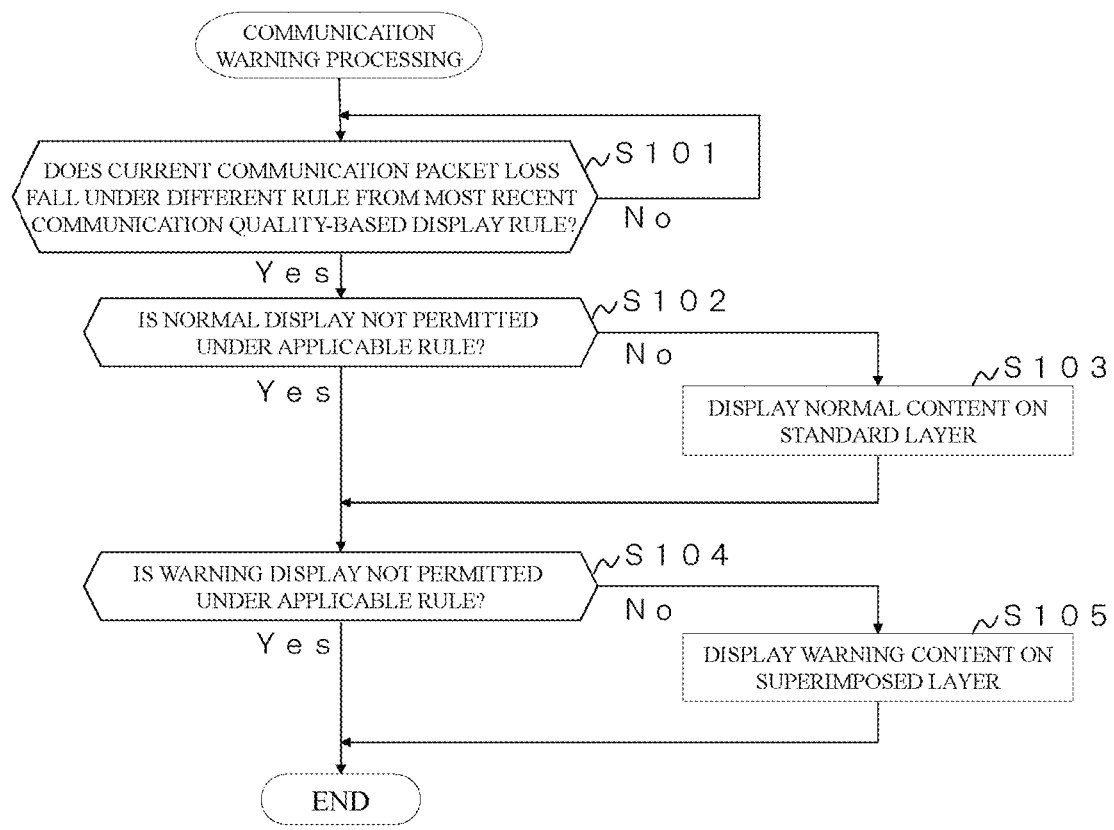
FIG. 7 illustrates a flow of communication warning processing.

FIG. 7 is a flow diagram of communication warning processing according to this embodiment. The communication warning processing is started, for example, at predetermined intervals when the work recording apparatus 100 starts.

First, the usable function restriction unit 133 determines whether or not the current communication packet loss percentage falls under a different rule from the most recent communication quality-based display rule (StepS101). Specifically, the usable function restriction unit 133 requests the packet loss percentage of the worker mobile terminal 200 for a predetermined latest period from the worker mobile terminal 200, and the communication unit 240 of the worker mobile terminal 200 transmits to the work recording apparatus 100 the packet loss percentage that is based on the number of lost packets with respect to the total number of communication packets. The usable function restriction unit 133 specifies the applicable section of the communication quality 142A of the communication quality-based display rule storage unit 142 relating to the received current packet loss percentage. When the applicable section has changed from the most recent communication section, that section is considered to fall under a different rule. When the section does not fall under a different rule ("No" in Step S101), the usable function restriction unit 133 performs the processing of Step S101 again.

When the current communication packet loss percentage falls under a different rule ("Yes" in Step S101), the usable function restriction unit 133 determines whether or not a normal display is not permitted under the applicable rule (Step S102). Specifically, the usable function restriction unit 133 acquires information about the normal display 142C that corresponds to the applicable section of the communication quality 142A of the communication quality-based display rule storage unit 142 relating to the received current packet loss percentage, and determines whether or not a value indicating whether or not to perform a normal display is a value at which a normal display is not to be performed. When a normal display is not permitted, the processing proceeds to Step S104.

When a normal display is not not-permitted ("No" in Step S102), the usable function restriction unit 133 issues an instruction to display the normal content on a standard layer (Step S103). Specifically, the usable function restriction unit 133 instructs the wearer display unit 121 to display the normal content on the standard layer. Then, the usable function restriction unit 133 proceeds the processing to Step S104.

Then, the usable function restriction unit 133 determines whether or not a warning display is not permitted under the applicable rule (Step S104). Specifically, the usable function restriction unit 133 acquires information about the warning display 142B that corresponds to the applicable section of the communication quality 142A of the communication quality-based display rule storage unit 142 relating to the received current packet loss percentage, and determines whether or not a value indicating whether or not to perform a warning display is a value at which a warning display is not to be performed. When a warning display is not permitted, the usable function restriction unit 133 finishes the communication warning processing.

When a warning display is not not-permitted ("No" in Step S104), the usable function restriction unit 133 issues an instruction to display the warning content on a superimposed layer (Step S105). Specifically, the usable function restriction unit 133 acquires the warning content specified by using the warning content 142D from the warning content storage unit 141, and instructs the wearer display unit 121 to display the warning content on the superimposed layer. Then, the usable function restriction unit 133 finishes the communication warning processing.

The processing flow of the communication warning processing is described above. According to the communication warning processing, the usable functions, such as a display that superimposes warning content, can be controlled based on the situation by specifying the communication situation of the worker mobile terminal 200.

Figure 8:
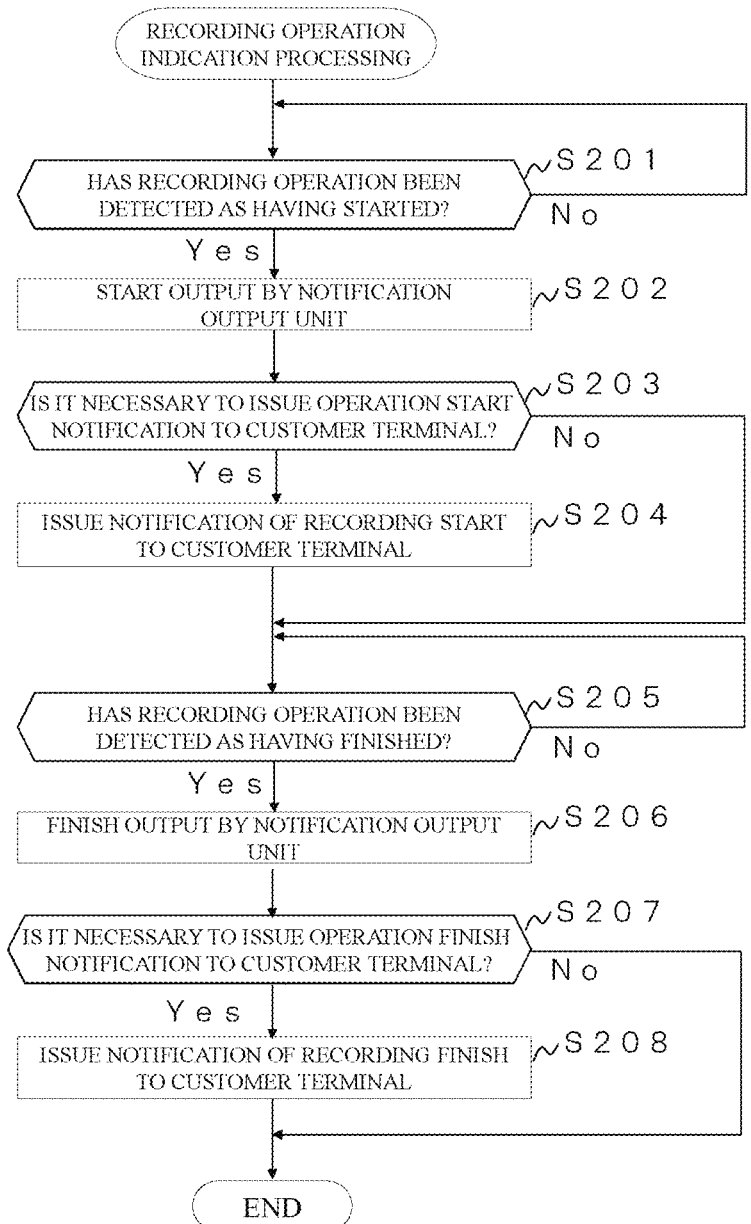
FIG. 8 illustrates a flow of recording operation indication processing.

FIG. 8 is a flow diagram of recording operation indication processing according to this embodiment. The recording operation indication processing is started when the work recording apparatus 100 starts.

First, the recording control unit 130 determines whether or not any one of, or both of, the imaging unit 160 and the audio recording unit 170 have been detected as having started a recording operation (Step S201). When a recording operation is not detected as having started ("No" in Step S201), the recording control unit 130 performs the processing of Step S201 again.

When a recording operation is detected as having started ("Yes" in Step S201), the notification output unit 122 starts output (Step S202). Specifically, the notification output unit 122 causes a light-emitting unit formed of a LED and the like that is mounted to the work recording apparatus 100 so as to be externally visible to blink in a predetermined pattern and the like.

Then, the recording control unit 130 determines whether or not it is necessary to issue an operation start notification to the customer mobile terminal 400 (Step S203). Specifically, the recording control unit 130 performs this determination by acquiring information specifying whether or not it is necessary to issue an operation start notification to the customer mobile terminal 400 that has been stored in advance in a recording area (not shown) and the like of the storage unit 140. When it is determined that a notification is not necessary, the recording control unit 130 proceeds the processing to Step S205.

When it is determined that a notification is necessary ("Yes" in Step S203), the recording control unit 130 issues an operation start notification to the customer mobile terminal 400 (Step S204). Specifically, the recording control unit 130 transmits a peer-to-peer message and the like via the communication unit of the worker mobile terminal 200 so that a message such as "recording has started" is transmitted to the customer mobile terminal 400.

Then, the recording control unit 130 determines whether or not the recording operation of both the imaging unit 160 and the audio recording unit 170 has finished (Step S205). When it is not detected that the recording operation of both the imaging unit 160 and the audio recording unit 170 has finished ("No" in Step S005), the recording control unit 130 performs the processing of Step S205 again.

When it is detected that the recording operation of both the imaging unit 160 and the audio recording unit 170 has finished ("Yes" in Step S005), the notification output unit 122 finishes the output (Step S206). Specifically, the notification output unit 122 finishes the blinking of the light-emitting unit formed of a LED and the like that is mounted to the work recording apparatus 100 so as to be externally visible.

Then, the recording control unit 130 determines whether or not it is necessary to issue an operation finish notification to the customer mobile terminal 400 (Step S206). Specifically, the recording control unit 130 performs this determination by acquiring information specifying whether or not it is necessary to issue an operation finish notification to the customer mobile terminal 400 that has been stored in advance in a recording area (not shown) and the like of the storage unit 140. When it is determined that a notification is not necessary, the recording control unit 130 finishes the recording operation indication processing.

When it is determined that a notification is necessary ("Yes" in Step S207), the recording control unit 130 issues an operation end notification to the customer mobile terminal 400 (Step S208). Specifically, the recording control unit 130 transmits a peer-to-peer message and the like via the communication unit of the worker mobile terminal 200 so that a message such as "recording has finished" is transmitted to the customer mobile terminal 400. Then, the recording control unit 130 finishes the recording operation indication processing.

The processing flow of the recording operation indication processing is described above. According to the recording operation indication processing, whether or not the worker is recording can be indicated via the notification output unit 122. This enables the discovery of cases in which the worker is recording information and the like that is not directly related to the work, for example.

Figure 9:
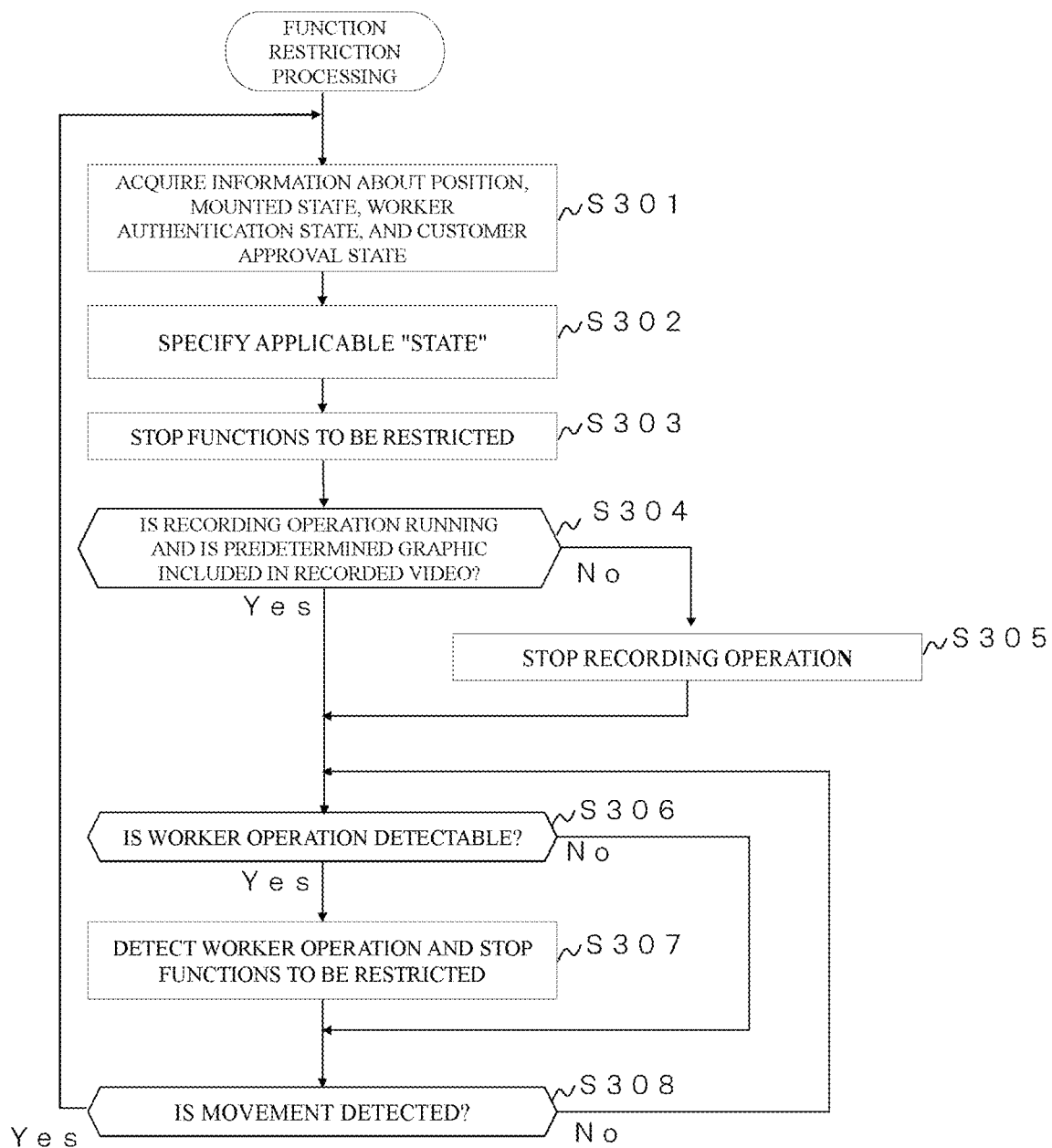
FIG. 9 illustrates a flow of function restriction processing.

FIG. 9 is a flow diagram of function restriction processing according to this embodiment. The function restriction processing is started when the work recording apparatus 100 starts.

First, the usable function restriction unit 133 acquires information about the position, mounted state, worker authentication state, and customer approval state (Step S301). Specifically, the usable function restriction unit 133 acquires information about the position by detecting the position with the position detection unit 132, acquires information about the mounted state by detecting the mounted state with the mount/dismount detection unit 153, acquires information about the authentication state of the worker from the user authentication unit 151, and acquires the recording key of the customer input into the worker mobile terminal 200.

Then, the usable function restriction unit 133 specifies the applicable "state" (Step S302). Specifically, the usable function restriction unit 133 refers to the state definition storage unit 144, and using the information acquired in Step S301, specifies the state 144A for which the reference value 144C of the item 144B satisfies the relationship indicated by the condition 144D.

Then, the usable function restriction unit 133 stops the functions to be restricted (Step S303). Specifically, the usable function restriction unit 133 refers to the state-based function restriction storage unit 143 regarding each of the states specified in Step S302, specifies the permission situation of the recording permission 143B, the image recognition permission 143C, the position detection permission 143D, the mobile terminal link permission 143E, and the operation detection permission 143F, and stops the functions having "not permitted" set for one or more of the applicable "states".

Then, the image recognition unit 134 and the work area identification mark detection unit 135 determine whether or not the recording operation is running, and whether or not a predetermined graphic is included in the recorded video (Step S304). Note that, the predetermined graphic is, for example, a graphic that is represented by an image including a predetermined color pattern, which is pasted in advance as a sticker at a position capable of being captured. In other words, it can be said that whether or not the worker is located at a position at which such an image is visible is determined. When the recording operation is running, and the predetermined graphic is included in the recorded video ("Yes" in Step S304), the processing proceeds to Step S306.

When the recording operation is not running, or when the predetermined graphic is not included in the recorded video ("No" in Step S304), the usable function restriction unit 133 stops the recording operation (Step S305). Then, the usable function restriction unit 133 proceeds the processing to Step S306.

The usable function restriction unit 133 determines whether or not the operation of the worker 10 is detectable. Step S306). Specifically, the usable function restriction unit 133 determines whether or not information about acceleration is acquirable from the acceleration sensor device 108. When information about acceleration is not acquirable, the usable function restriction unit 133 proceeds the processing to Step S308.

When information about acceleration is acquirable from the acceleration sensor device 108 ("Yes" in Step S306), the usable function restriction unit 133 detects the worker operation and stops the functions to be restricted (Step S307). Specifically, the usable function restriction unit 133 acquires information about acceleration from the acceleration sensor device 108, compares the acquired information with a predetermined threshold based on an amount of change per unit time of acceleration, and specifies whether or not the operation by the worker 10 is "slow" or "vigorous". Further, the usable function restriction unit 133 refers to the state definition storage unit 144, and using the information about the operation of the worker 10, specifies the state 144A for which the reference value 144C of the item 144B satisfies the relationship indicated by the condition 144D. Then, the usable function restriction unit 133 stops the functions to be restricted based on the state.

Then, the usable function restriction unit 133 determines whether or not movement of the work recording apparatus 100 has been detected (Step S308). Specifically, the usable function restriction unit 133 acquires the position information from the position detection unit 132, compares the acquired position information with the position acquired in Step S301, and determines whether or not movement of a predetermined amount or more has been detected. When movement is not detected ("No" in Step S308), the usable function restriction unit 133 returns the processing to Step S306.

When movement has been detected ("Yes" in Step S308), the usable function restriction unit 133 returns the processing to Step S001.

The processing flow of the function restriction processing is described above. According to the function restriction processing, appropriate function restrictions can be placed based on the state in which the work recording apparatus 100 is being used. Consequently, for example, the imaging of confidential information and the like by the worker in secret in areas where image-capturing is prohibited can be prevented.

Figure 10:
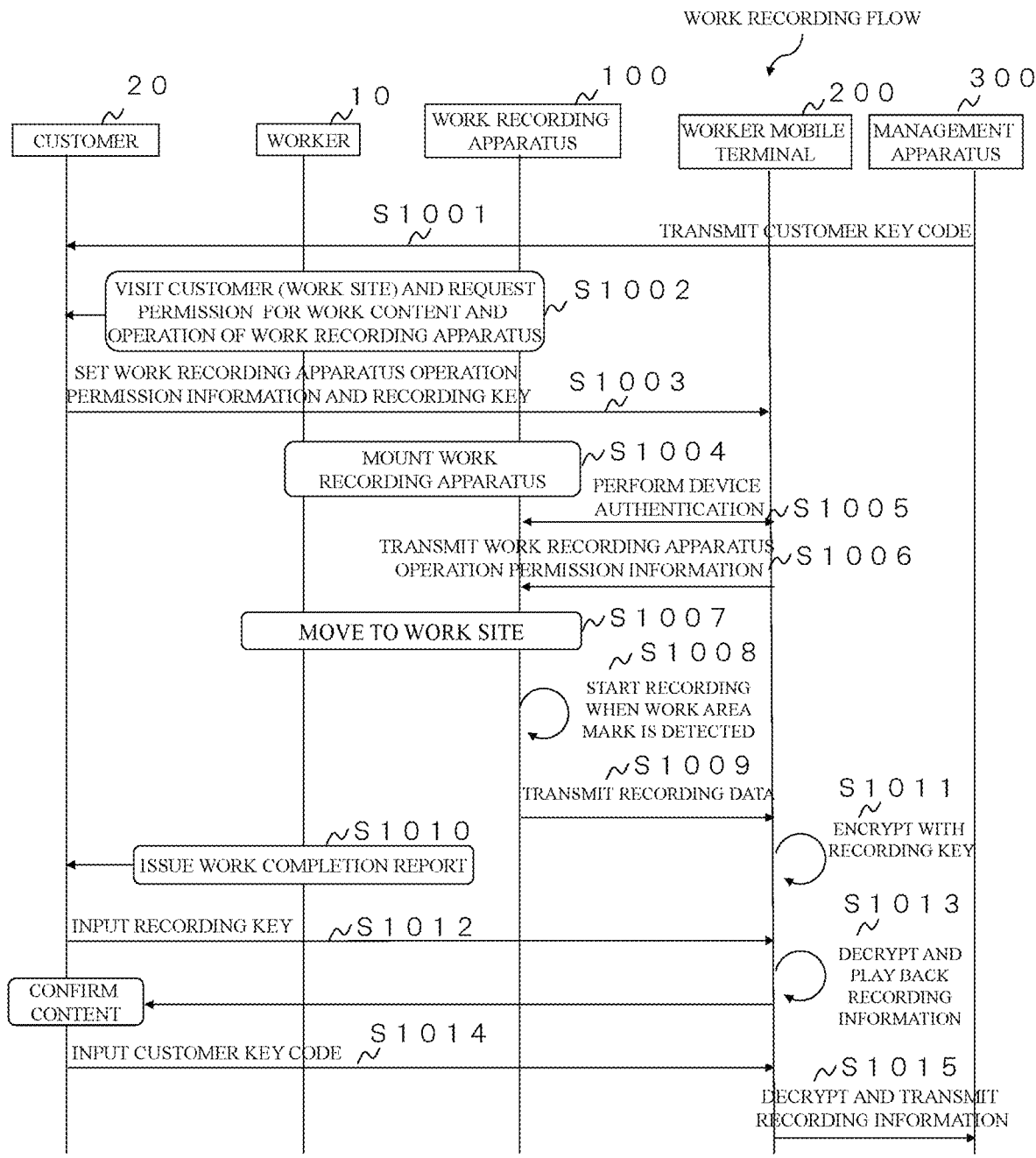
FIG. 10 illustrates a work recording flow.

FIG. 10 illustrates a work recording flow. In the work recording flow, a work record is collected with the management apparatus 300 by causing the worker 10 to visit the customer 20 to receive approval for the work content, and receive approval for the work recording after performing the work at the work site.

A customer key code that is unique to each customer has been transmitted in advance to the customer 20 from the management apparatus 300 (Step S1001).

The worker 10 visits the customer (work site), and requests permission for the work content and operation of the work recording apparatus (Step S1002).

The customer 20 who received the request inputs permission to operate the work recording apparatus 100, and the recording key, into the worker mobile terminal 200 (Step S1003).

Then, the worker 10 mounts the work recording apparatus 100 (Step S1004). After the work recording apparatus 100 has been mounted, device authentication is performed between the work recording apparatus 100 and the worker mobile terminal 200 (Step S1005). When the authentication has finished, work recording apparatus operation permission information is transmitted from the worker mobile terminal 200 to the work recording apparatus 100 (Step S1006).

Then, the worker 10 moves to the work site (Step S1007).

At the work site, the work recording apparatus 100 starts video recording when an image set in advance as a work area mark is included in video information captured by the work recording apparatus 100 (Step S1008). Then, the work recording apparatus 100 continuously transmits the recorded video information to the worker mobile terminal 200 (Step S1009).

The received video information is encrypted with the recording key by the worker mobile terminal 200 (Step S1011). At a different time from this, the worker 10 issues a work completion report to the customer 20 (Step S1010). After receiving the work completion report, the customer 20 inputs the recording key into the worker mobile terminal 200 (Step S1012).

After receiving the input of the recording key, the worker mobile terminal 200 uses the recording key to decrypt and playback the recording information that has been stored encrypted (Step S1013). The customer 20 confirms the content of the played back video information to check that the played back video information does not contain any leaks of confidential information. Further, the customer 20 inputs into the worker mobile terminal 200 a customer key code unique to the customer (Step S1014). When the input of the customer key code is received, the worker mobile terminal 200 decrypts the recording information, and transmits the decrypted recording information to the management apparatus 300 (Step S1015).

An example of the work recording flow is described above. Consequently, a work record can be collected with the management apparatus 300 by causing the worker 10 to visit the customer 20 to receive approval for the work content, and receive approval for the work recording after performing the work at the work site.

Figure 11:
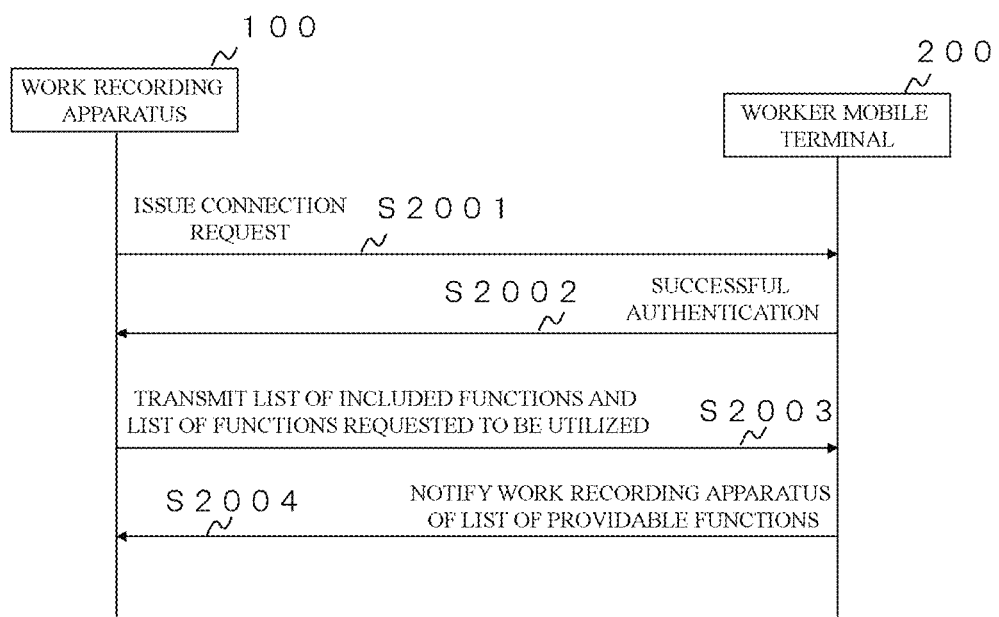
FIG. 11 illustrates a flow of device authentication between a work recording apparatus and a worker mobile terminal.

FIG. 11 illustrates a flow of device authentication between the work recording apparatus 100 and the worker mobile terminal 200. By executing this flow, communication between the work recording apparatus 100 and the worker mobile terminal 200 can be carried out.

The work recording apparatus 100 issues a connection request to the worker mobile terminal 200 (Step S2001). Then, the worker mobile terminal 200 transmits results information of a successful authentication (Step S2002). Then, the work recording apparatus 100 transmits a list of the included functions and a list of the functions requested to be utilized (Step S2003). The worker mobile terminal 200 notifies the work recording apparatus 100 of a list of providable functions from among the list of the functions requested to be utilized (Step S2004).

Carrying out the processing in this manner enables the work recording apparatus 100 to complement functions that are lacking by delegating those functions to the worker mobile terminal 200.

Figure 12:
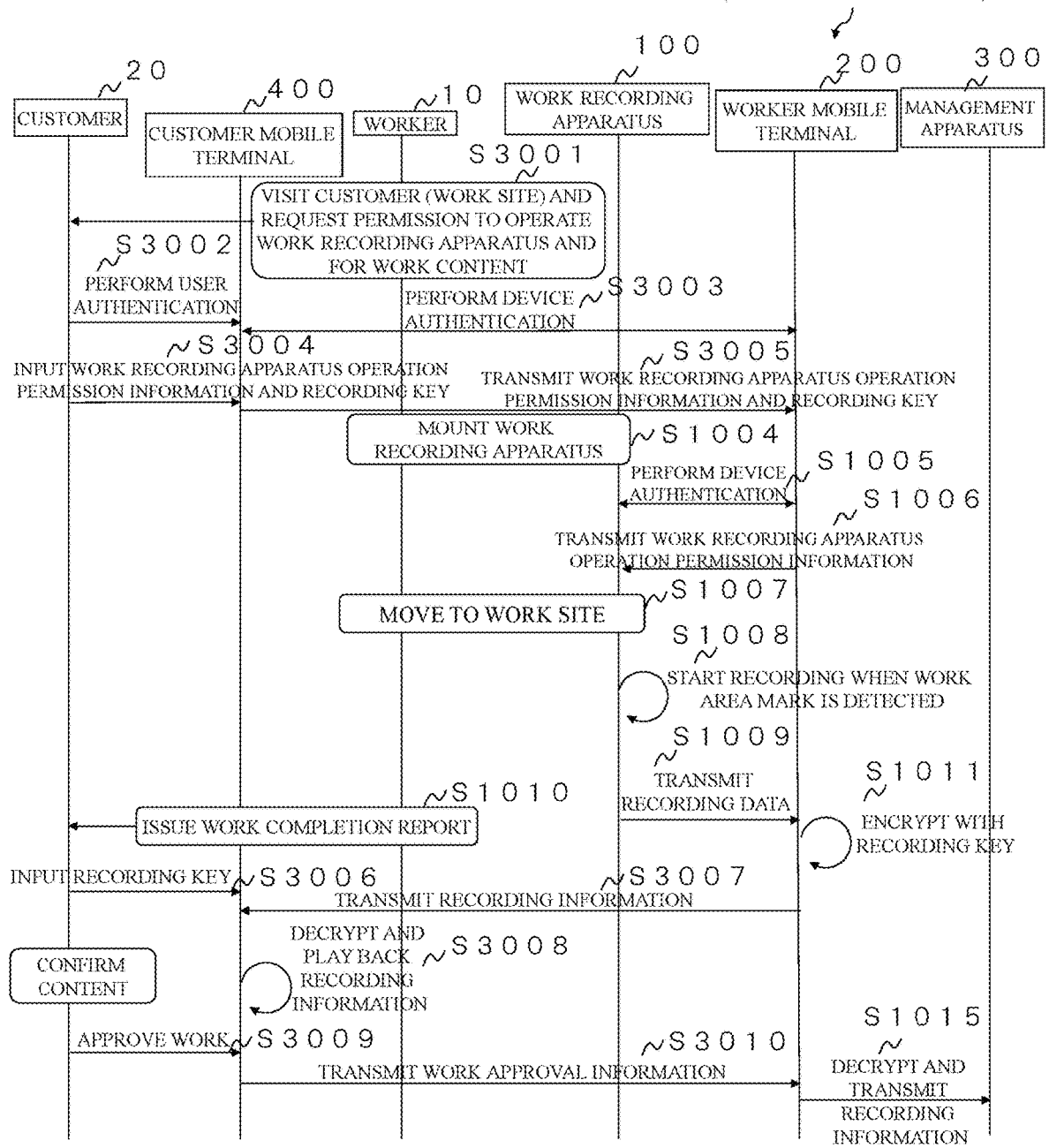
FIG. 12 illustrates a work recording flow (customer terminal use).

FIG. 12 illustrates a work recording flow (customer terminal use). In the work recording flow (customer terminal use), the point that the work record is collected with the management apparatus 300 by causing the worker 10 to visit the customer 20 to receive approval for the work content, and receive approval for the work recording after performing the work at the work site is the same as the above-mentioned work recording flow. However, a difference is that the confirmation of the work record by the customer is carried out by the customer mobile terminal 400. The following description mainly focuses on the processing that is different from the above-mentioned work recording flow. Note that, steps denoted with the same number as the above-mentioned work recording flow are the same processing as described above, and hence a description of such steps is omitted below.

The worker 10 visits the customer (work site), and requests permission to operate the work recording apparatus and for the work content (Step S3001). The customer 20 performs user authentication of the customer mobile terminal 400 (Step S3002), and the customer mobile terminal 400 performs device authentication with the worker mobile terminal 200 (Step S3003).

Then, the customer 20 inputs work recording apparatus operation permission information and the recording key into the customer mobile terminal 400 (Step S3004). The customer mobile terminal 400 transmits the input work recording apparatus operation permission information and recording key to the worker mobile terminal 200 (Step S3005).

When the customer 20 receives a work completion report from the worker 10, the customer 20 inputs the recording key into the customer mobile terminal 400 (Step S3006). The worker mobile terminal 200 transmits the encrypted recording data to the customer mobile terminal 400 (Step S3007), and using the recording key, the customer mobile terminal 400 decrypts and plays back the recording information (Step S3008). The customer 20 confirms the content of the work record with the customer mobile terminal 400, and then performs a work approval input (Step S3009). The customer mobile terminal 400 transmits the work approval information to the worker mobile terminal 200 (Step S3010).

The above is a description of the work recording flow (customer terminal use). According to the work recording flow (customer terminal use), a person in charge at the customer 20 who feels that the direct input of confidential information, such as a recording key, into the worker mobile terminal 200 is a security risk, is able to input the recording key using a terminal that is managed by the customer 20, thereby mitigating concerns about security risks.

Figure 13:
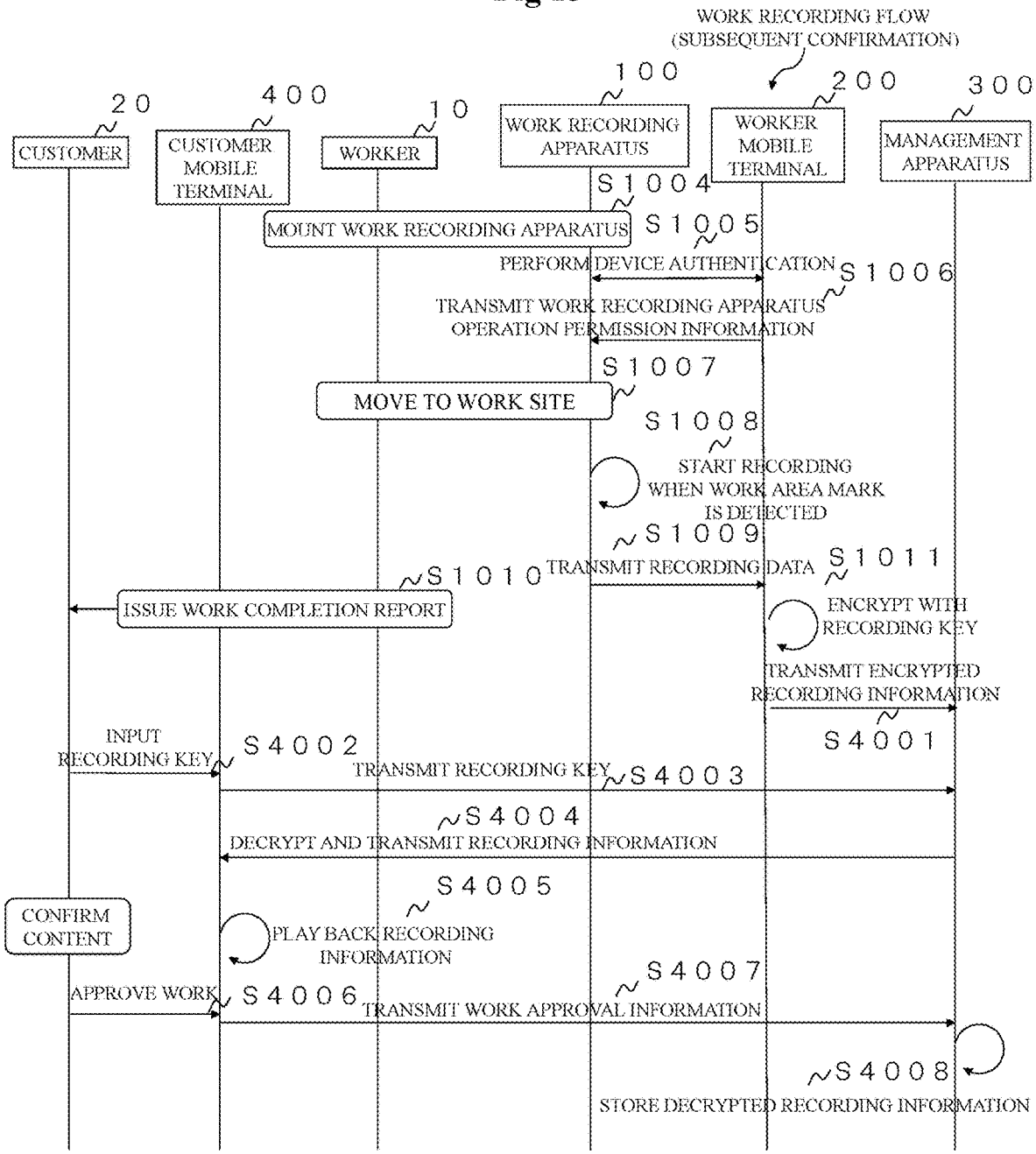
FIG. 13 illustrates a work recording flow (subsequent confirmation).

FIG. 13 illustrates a work recording flow (subsequent confirmation). In the work recording flow (subsequent confirmation), the point that the work record is collected with the management apparatus 300 by causing the worker 10 to visit the customer 20 to receive approval for the work content, and receive approval for the work recording after performing the work at the work site is the same as the above-mentioned work recording flow. However, a difference is that the confirmation of the work record by the customer is subsequently carried out by the customer mobile terminal 400. The following description mainly focuses on the processing that is different from the above-mentioned work recording flow. Note that, steps denoted with the same number as the above-mentioned work recording flow are the same processing as described above, and hence a description of such steps is omitted below. Further, the point that the worker 10 visits the customer 20 and receives approval prior to the work starting is also the same, and hence a description of that point is omitted below.

The worker mobile terminal 200 encrypts the recording data with a recording key (Step S1011), and then transmits the encrypted recording information to the management apparatus 300 (Step S4001). Then, the customer 20 inputs the recording key into the customer mobile terminal 400 (Step S4002). When the customer mobile terminal 400 transmits the recording key into the management apparatus 300 (Step S4003), the management apparatus 300 decrypts the recording information with the recording key and transmits the decrypted recording information to the customer mobile terminal 400 (Step S4004). When the customer mobile terminal 400 has played back the recording information (Step S4005), the customer mobile terminal 400 receives work approval from the customer 20 (Step S4006), and transmits the work approval information to the management apparatus 300 (Step S4007). When the work approval information has been received, the management apparatus 300 stores the decrypted recording information (Step S4008).

The above is a description of the work recording flow (subsequent confirmation). According to the work recording flow (subsequent confirmation), confirmation of the work record can be carried out at any time that is convenient to the customer 20 after the work operation by the worker has finished. Therefore, the work confirmation can be carried out efficiently.

Figure 14:
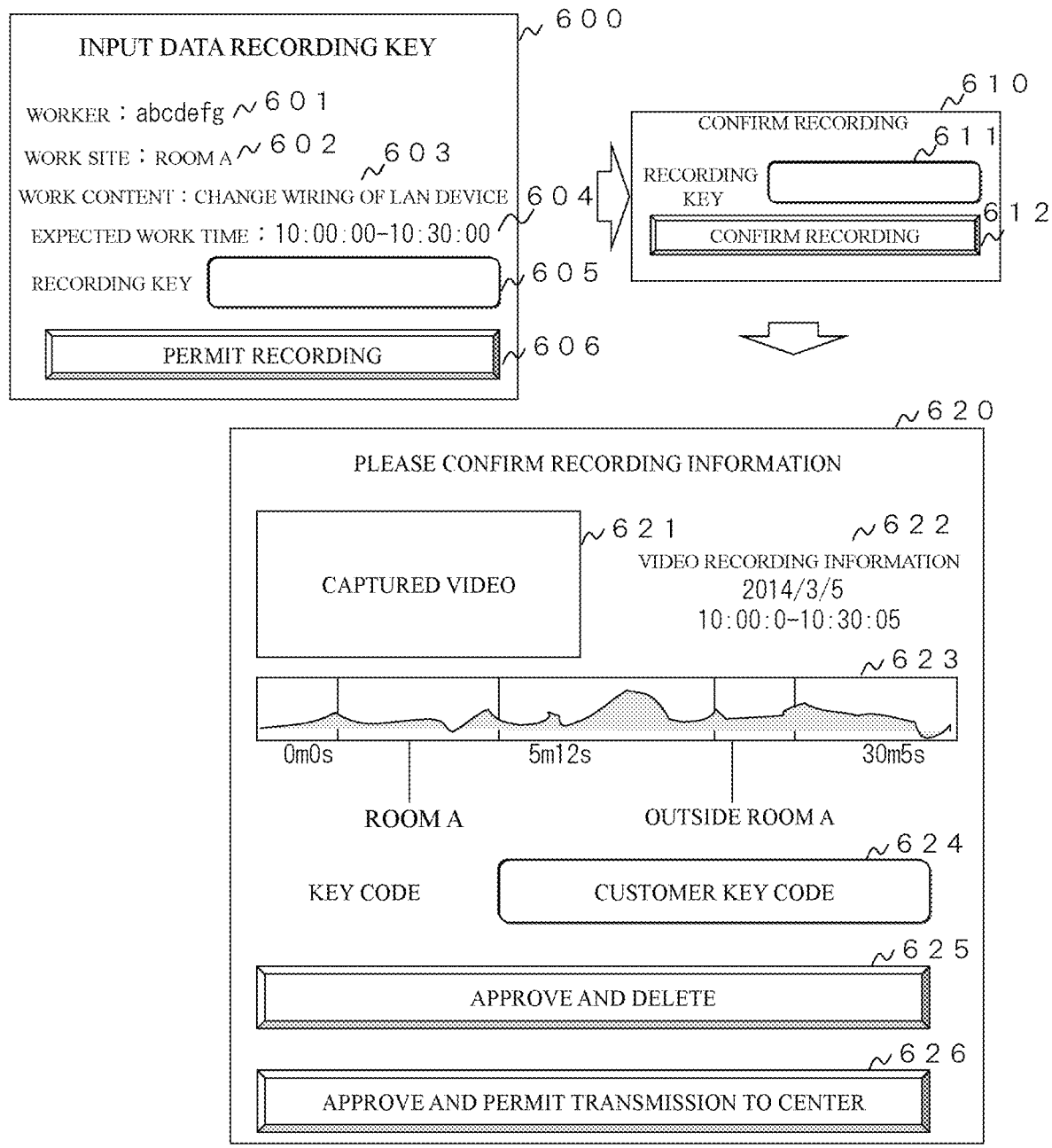
FIG. 14 illustrates a flow on an output screen of a worker mobile terminal in a work recording flow.

FIG. 14 illustrates a flow on an output screen of the worker mobile terminal 200 in the work recording flow. A screen 600 is an example of a screen for inputting the recording key in Step S1003 and for inputting permission to record. The screen 600 includes a worker 601, a work site 602, a work content 603, an expected work time 604, a recording key input area 605, and a recording permission input button 606. Permission is granted by the customer prior to the work starting by inputting information about the recording key into the recording key input area 605 and pressing the recording permission input button 606.

A recording confirmation screen 610 includes an input area 611 of the recording key required for decryption in order to confirm the content of the work record, and a playback button 612 for recording confirmation. This screen can be said to be the input screen displayed in Step S1012.

A work content confirmation screen 620 includes a playback section 621 of the video information captured by the work recording apparatus 100, a video recording information display area 622 of the imaging time and the like, a graph display area 623 organizing the video recording information in a manner that allows the worker to see the recording information in a timeline, an input section 624 of the customer key code, an approve and delete button 625 for instructing approval of the work content and deletion of the work record from the worker mobile terminal 200, and an approval and transmission permission button 626 for instructing approval of the work content and transmission of the information to the management apparatus 300.

Figure 15:
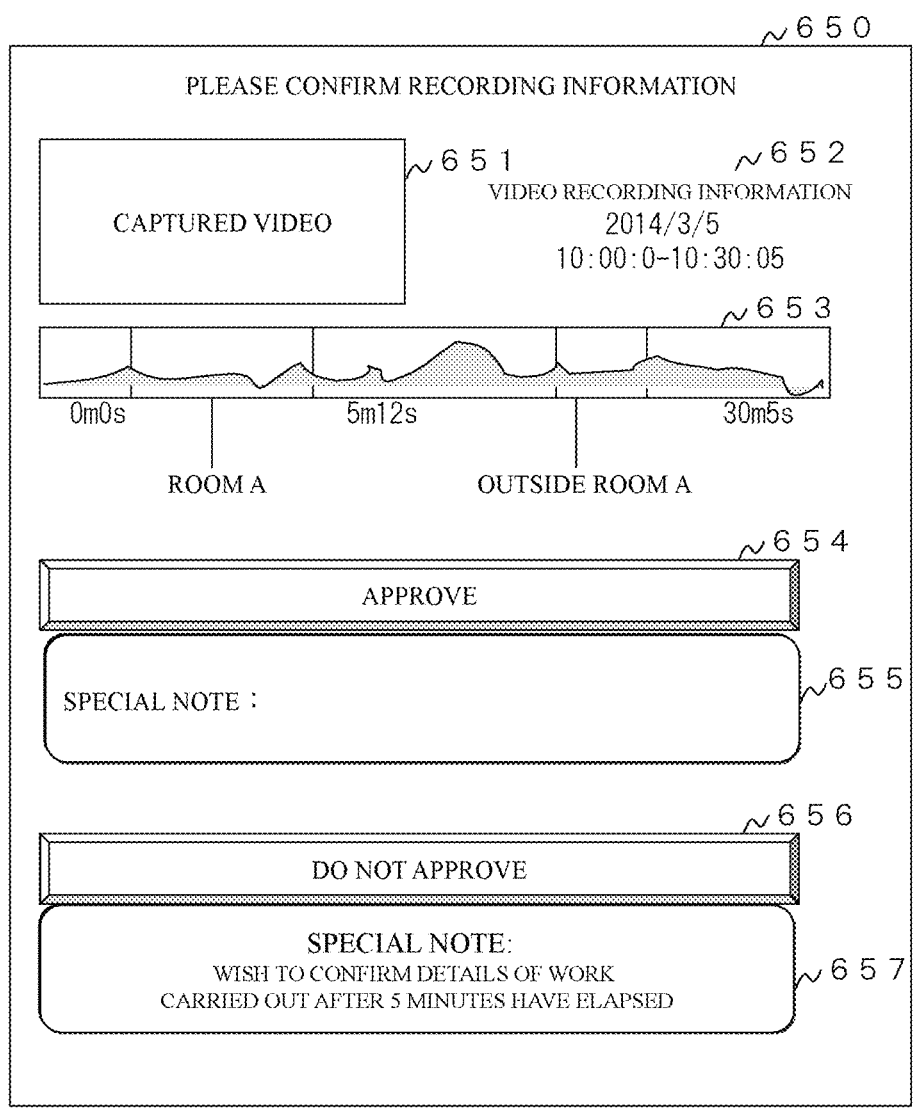
FIG. 15 illustrates a flow on an output screen of a customer mobile terminal in a work recording flow (subsequent confirmation).

FIG. 15 illustrates a flow on an output screen of the customer mobile terminal 400 in the work recording flow (subsequent confirmation). A screen 650 is an example of the screen for playing back the work record and inputting work approval in Step S4005. The screen 650 includes a playback section 651 of the video information captured by the work recording apparatus 100, a video recording information display area 652 of the imaging time and the like, a graph display area 653 organizing the video recording information in a manner that allows the worker to see the recording information in a timeline, an approve button 654 for instructing approval of the work content, a special note input area 655 for receiving input of a message that the customer 20 may wish to add regarding approval, a do not approve button 656 for instructing non-approval of the work content, and a non-approval special note input area 657 for receiving input of an explanation by the customer 20 of the reasons for non-approval that the customer 20 may wish to add.

The work recording system 1 according to the first embodiment of the present invention is described above. According to the first embodiment, the leaking of confidential information can be more properly prevented.

The present invention is not limited to the above-mentioned first embodiment. Further, various changes may be made to the first embodiment within the scope of the technical concept of the present invention. For example, in the first embodiment, the work recording apparatus 100 is described based on the example of a wearable apparatus in the form of a pair of glasses. However, the present invention is not limited to such an apparatus. For example, the work recording apparatus 100 may be a helmet-type wearable apparatus covering a wider area of the worker's head, or may be a wearable apparatus that is mounted to only one eye. Further, the worker mobile terminal 200 and the work recording apparatus 100 may be integrated.

In addition, in the first embodiment, the work recording apparatus 100 is capable of recording when a predetermined mark is captured. However, the present invention is not limited to this. For example, the work recording apparatus 100 may be configured to forcibly stop recording when a predetermined mark is captured and discard the related recording information. Still further, for example, the work recording apparatus 100 may also be configured to capture images for a predetermined period of time when a predetermined mark is captured.

Further, in the first embodiment, the work recording apparatus 100 may be configured so that the work recording apparatus 100 is capable of recording when a predetermined mark unique to each work procedure is captured. Configuring the work recording apparatus 100 in this manner enables a predetermined work procedure to be recorded when a unique seal and the like pasted to the work target device is captured, and hence such a configuration is effective in suppressing picking up the wrong work target device and in making a mistake in the procedure order.

In addition, the technical elements of the above-mentioned embodiment may be applied independently or divided into a plurality of components, such as program components and hardware components.

The present invention has been described above by mainly focusing on the embodiment.

REFERENCED SIGNS LIST

1 . . . work recording system, 10 . . . worker, 20 . . . customer, 100 . . . work recording apparatus, 120 . . . display control unit, 130 . . . recording control unit, 140 . . . storage unit, 150 . . . authentication control unit, 160 . . . imaging unit, 170 . . . audio recording unit, 180 . . . communication unit, 200 . . . worker mobile terminal, 210 . . . display unit, 220 . . . audio output unit, 230 . . . position detection unit, 240 . . . communication unit, 250 . . . authentication unit, 300 . . . management apparatus, 400 . . . customer mobile terminal

The invention claimed is:

1. A work recording restriction apparatus, comprising:
a recording control unit, implemented using at least one hardware processor, configured to record a work situation;
a position detection unit configured to detect a position;
a usable function restriction unit configured to acquire the position using position information from the position detection unit, specify an applicable predetermined state through use of the position detected by the position detection unit, and restrict recording functions of the recording control unit that record the work situation based on the specified applicable predetermined state, each of the position detection unit, and the usable function restriction unit comprising at least one of an application-specific integrated circuit (ASIC) and a graphics processing unit (GPU),
wherein the recording control unit is configured to generate and record video information by capturing images of the work situation optically,
wherein the work recording restriction apparatus further comprises a work area identification mark detection unit configured to detect a predetermined image of a graphic, applied in advance so as to be visible in a work area having the work situation, the predetermined image included in the video information generated by the recording control unit,
wherein the usable function restriction unit is configured to release the restriction of the recording functions that record the work situation of the recording control unit while the predetermined image is included in a subject captured by a camera device in real time and the work area identification mark detection unit detects the predetermined image, and
the work area identification mark detection unit transfers the video information captured by an imaging unit to a storage unit as audiovisual information only when an image including a predetermined pattern is included in a screen, wherein each of the work area identification mark detection unit, the imaging unit, and the storage unit processing unit (GPU).

2. The work recording restriction apparatus according to claim 1, further comprising:
a data encryption unit configured to receive recording key information, use the recording key information to encrypt the work situation recorded by the recording control unit, and store the encrypted work situation in the storage unit,
wherein the data encryption unit is configured to decrypt the encrypted work situation when the recording key information is received during reading of the encrypted work situation from the storage unit, and
wherein the data encryption unit comprising at least one of an application-specific integrated circuit (ASIC) and a graphics processing unit (GPU).

3. The work recording restriction apparatus according to claim 1, further comprising a mount/dismount detection unit configured to detect mounting and dismounting of the work recording restriction apparatus by a wearer onto and off a body of the wearer,
  wherein the usable function restriction unit is configured to restrict the functions during a period in which the mounting is not detected by the mount/dismount detection unit and release the restriction during a period in which the mounting is detected, and
  wherein the mount/dismount detection unit comprising at least one of an application-specific integrated circuit (ASIC) and a graphics processing unit (GPU).

4. The work recording restriction apparatus according to claim 1, further comprising a predetermined light-emitting unit, wherein the recording control unit is configured to control the predetermined light-emitting unit to perform a predetermined output during a period in which the work situation is being recorded, and
  wherein the predetermined light-emitting unit comprising at least one of an application-specific integrated circuit (ASIC) and a graphics processing unit (GPU).

5. The work recording restriction apparatus according to claim 1, wherein the graphic includes a predetermined color pattern applied as a sticker and positioned so as to be captured in the video information.

6. A work recording restriction system, comprising:
  a work recording restriction apparatus;
  a terminal to be communicably connected to the work recording restriction apparatus; and
  a management apparatus configured to perform communication to and from the terminal,
  the work recording restriction apparatus comprising:
    a recording control unit configured to acquire a work situation and transmit the acquired work situation to the terminal;
    a position detection unit configured to detect a position; and
    a usable function restriction unit configured to acquire the position using position information from the position detection unit, specify an applicable predetermined state through use of the position detected by the position detection unit, and restrict recording functions of the recording control unit that record the work situation based on the specified applicable predetermined state, each of the recording control unit, the position detection unit, and the usable function restriction unit comprising at least one of an application-specific integrated circuit (ASIC) and a graphics processing unit (GPU), the terminal comprising:
    a recording key input reception unit configured to receive an input of a recording key;
    an encryption unit configured to use the recording key to encrypt information about the work situation transmitted by the recording control unit;
    a display unit configured to use the recording key to decrypt and display the information about the work situation encrypted by the encryption unit when an input of the recording key is received;
    a confirmation input reception unit configured to receive a confirmation input of the information about the work situation; and
    a communication unit configured to transmit to the management apparatus the information about the work situation for which the confirmation input has been received by the confirmation input reception unit, each of the recording key input reception unit, the encryption unit, the display unit, the confirmation input reception unit, and the communication unit comprising at least one of an application-specific integrated circuit (ASIC) and a graphics processing unit (GPU),
  the management apparatus comprising a storage unit configured to store the received information about the work situation,
  wherein the recording control unit is configured to generate and record video information by capturing images of the work situation optically,
  wherein the work recording restriction apparatus further comprises a work area identification mark detection unit configured to detect a predetermined image of a graphic, applied in advance so as to be visible in a work area having the work situation, the predetermined image included in the video information generated by the recording control unit,
  wherein the usable function restriction unit is configured to release a restriction of the recording functions that record the work situation of the recording control unit while the predetermined image is included in a subject captured by a camera device in real time and the work area identification mark detection unit detects the predetermined image, and
  the work area identification mark detection unit transfers the video information captured by an imaging unit to the storage unit as audiovisual information only when an image including a predetermined pattern is included in a screen, each of the work area identification mark detection unit, the imaging unit, and the storage unit comprising at least one of an application-specific integrated circuit (ASIC) and a graphics processing unit (GPU).

7. The work recording restriction system according to claim 6, wherein the work recording restriction apparatus further comprises;
  an inner side display unit that is visible to at least a wearer; and
  an outer side display unit mounted to a position that is externally visible,
  wherein the work recording restriction apparatus is configured to display predetermined video information on the inner side display unit based on a communication situation between the terminal and the management apparatus, and
  wherein each of the inner side display unit, and the outer side display unit graphics processing unit (GPU).

8. A work recording restriction system, comprising:
  a work recording restriction apparatus;
  a terminal to be communicably connected to the work recording restriction apparatus; and
  a management apparatus configured to perform communication to and from the terminal,
  the work recording restriction apparatus comprising:
    a recording control unit configured to acquire a work situation and transmit the acquired work situation to the terminal;
    a position detection unit configured to detect a position; and
    a usable function restriction unit configured to acquire the position using position information from the position detection unit, specify an applicable predetermined state through use of the position detected by the position detection unit, and restrict recording functions of the recording control unit that record the work situation based on the specified applicable predetermined state, each of the recording control unit, the position detection unit, and the usable function restriction unit comprising at least one of an application-specific integrated circuit (ASIC) and a graphics processing unit (GPU), the terminal comprising:
- a recording key input reception unit configured to receive an input of a recording key;
- an encryption unit configured to use the recording key to encrypt information about the work situation transmitted by the recording control unit; and
- a communication unit configured to transmit to the management apparatus the encrypted information about the work situation, each of the recording key input reception unit, the encryption unit, and the communication unit comprising at least one of an application-specific integrated circuit (ASIC) and a graphics processing unit (GPU), the management apparatus comprising:
- a storage unit configured to store the received encrypted information about the work situation;
- an output unit configured to use the recording key to decrypt and output the encrypted information about the work situation stored in the storage unit when an input of the recording key is received;
- a confirmation input reception unit configured to receive a confirmation input of the information about the work situation; and
- a decryption and storage unit configured to use the recording key to decrypt encrypted information of the information about the work situation for which the confirmation input has been received by the confirmation input reception unit, and stores the decrypted information about the work situation in the storage unit, each of the storage unit, the output unit, the confirmation input application-specific integrated circuit (ASIC) and a graphics processing unit (GPU), wherein the recording control unit is configured to generate and record video information by capturing images of the work situation optically, wherein the work recording restriction apparatus further comprises a work area identification mark detection unit configured to detect a predetermined image of a graphic, applied in advance so as to be visible in a work area having the work situation, the predetermined image included in the video information generated by the recording control unit, wherein the usable function restriction unit is configured to release the restriction of the recording functions that record the work situation of the recording control unit while the predetermined image is included in a subject captured by a camera device in real time and the work area identification mark detection unit detects the predetermined image, and the work area identification mark detection unit transfers the video information captured by an imaging unit to the storage unit as audiovisual information only when an image including a predetermined pattern is included in a screen, each of the work area identification mark detection unit, and the imaging unit comprising at least one of an application-specific integrated circuit (ASIC) and a graphics processing unit (GPU).

9. A work recording restriction method for recording work through use of a computer, the work recording restriction method comprising executing, by the computer:
- a recording control step of recording a work situation;
- a position detection step of detecting a position;
- a usable function restriction step of acquiring the position using position information obtained in the position detection step, specifying an applicable predetermined state through use of the position detected in the position detection step, and restricting recording functions that record the work situation executed in the recording control step based on the specified applicable predetermined state, each of the recording control step, the position detection step, and the usable function restriction step being performed by units comprising at least one of an application-specific integrated circuit (ASIC) and a graphics processing unit (GPU);
- generating and recording steps of generating and recording with a recording control unit video information by capturing images of the work situation optically;
- a detecting step of detecting with a work recording restriction apparatus comprising a work area identification mark detection unit a predetermined image of a graphic, applied in advance so as to be visible in a work area having the work situation, the predetermined image included in the video information generated by the recording control units;
- a transferring step of transferring, with a work area identification mark detection unit, the video information captured by an imaging unit to a storage unit as audiovisual information only when an image including a predetermined pattern is included in a screen; and
- a releasing step of releasing by way of a usable function restriction unit a restriction of the recording functions that record the work situation of the recording control unit on the part or all of the functions while the predetermined image is included in a subject captured by a camera device in real time and the mark detection unit detects the predetermined image, each of the generating and recording steps, the detection step, the transferring step, and the releasing step being performed by units comprising at least one of an application-specific integrated circuit (ASIC) and a graphics processing unit (GPU).

10. A work recording restriction method using a work recording restriction system, the work recording restriction system comprising:
- a work recording restriction apparatus;
- a terminal to be communicably connected to the work recording restriction apparatus; and
- a management apparatus configured to perform communication to and from the terminal, the work recording restriction method comprising:
executing, by the work recording restriction apparatus;
- a recording control step of acquiring a work situation and transmitting the acquired work situation to the terminal;
- a position detection step of detecting a position; and
- a usable function restriction step of acquiring the position using position information from the position detection unit, specifying an applicable predetermined state through use of the position detected in the position detection step, and restricting recording functions that record the work situation in the recording control step based on the specified applicable predetermined state, each of the recording control step, the position detection step, and the usable function restriction step being performed by units comprising at least one of an application-specific integrated circuit (ASIC) and a graphics processing unit (GPU);

executing, by the terminal;

a recording key input reception step of receiving an input of a recording key;

an encryption step of using the recording key to encrypt information about the work situation transmitted in the recording control step;

a display step of using the recording key to decrypt and display the information about the work situation encrypted in the encryption step when an input of the recording key is received;

a confirmation input reception step of receiving a confirmation input of the information about the work situation; and a communication step of transmitting to the management apparatus the information about the work situation for which the confirmation input has been received in the confirmation input reception step, wherein each of the recording key input reception step, the encryption step, the display step, the confirmation input reception step, and the communication step being performed by units comprising at least one of an application-specific integrated circuit (ASIC) and a graphics processing unit (GPU); and executing, by the management apparatus, a storage step of storing the received information about the work situation in a predetermined storage unit; and executing, by way of at least one of the work recording restriction apparatus and the management apparatus, generating and recording steps of generating and recording with a recording control unit video information by capturing images of the work situation optically;

a detecting step of detecting with a work recording restriction apparatus comprising a work area identification mark detection unit a predetermined image of a graphic, applied in advance so as to be visible in a work area having the work situation, the predetermined image included in the video information generated by the recording control unit;

a transferring step of transferring, with the work area identification mark detection unit, the video information captured by an imaging unit to a storage unit as audiovisual information only when an image including a predetermined pattern is included in a screen; and a releasing step of releasing by way of a usable function restriction unit a restriction of the recording functions that record the work situation of the recording control unit while the predetermined image is included in a subject captured by a camera device in real time and the mark detection unit detects the predetermined image, wherein each of the storage step, the generating and recording steps, the detecting step, and the transferring step being performed by units comprises at least one of an application-specific integrated circuit (ASIC) and a graphics processing unit (GPU).

* * * * *